United States Patent
Kim et al.

(10) Patent No.: US 10,665,186 B2
(45) Date of Patent: *May 26, 2020

(54) DISPLAY APPARATUS

(71) Applicant: LG Display Co., Ltd., Seoul (KR)

(72) Inventors: Yeonkyung Kim, Paju-si (KR); TaeWoong Moon, Paju-si (KR); JungHyun Lee, Paju-si (KR); YongSeok Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,248

(22) Filed: Oct. 11, 2018

(65) Prior Publication Data

US 2019/0114980 A1    Apr. 18, 2019

(30) Foreign Application Priority Data

Oct. 18, 2017   (KR) ........................ 10-2017-0135316

(51) Int. Cl.
*G09G 3/36*      (2006.01)
*G06F 3/041*     (2006.01)
(Continued)

(52) U.S. Cl.
CPC ......... *G09G 3/3648* (2013.01); *G02F 1/1368* (2013.01); *G02F 1/13338* (2013.01);
(Continued)

(58) Field of Classification Search
CPC ........... G02F 1/13338; G02F 1/136213; G02F 1/136286; G02F 1/1368;
(Continued)

(56) References Cited

U.S. PATENT DOCUMENTS

2009/0102779 A1*  4/2009  Jo .................... G09G 3/3696
                                                       345/101
2010/0051952 A1*  3/2010  Kim ................. H01L 27/1288
                                                        257/59

(Continued)

*Primary Examiner* — Afroza Chowdhury
(74) *Attorney, Agent, or Firm* — Fenwick & West LLP

(57) ABSTRACT

Disclosed is a display apparatus including a gate driving circuit, which stably holds an output signal during a touch sensing period. The display apparatus includes a display panel including a display area including a plurality of gate lines, a plurality of data lines, and a plurality of touch sensors, a gate driving circuit dividing the display area into a plurality of horizontal blocks and driving gate lines of a horizontal block by units of horizontal blocks at every display period in one frame, and a touch driving circuit sensing a touch through touch sensors of the horizontal block by units of horizontal blocks at every touch sensing period in the one frame. The gate driving circuit includes a plurality of driving stage groups each including a plurality of driving stages supplying a scan pulse to gate lines included in a corresponding horizontal block at every display period and a plurality of holding stage groups each including at least one holding stage supplying a carry signal to a rear driving stage group according to a voltage of a first control node and a voltage of a second control node based on first and second node control powers and an output signal supplied from a front driving stage group, the plurality of holding stages being disposed between the plurality of driving stage groups. Each of the first and second node control powers includes an alternating current (AC) voltage.

23 Claims, 15 Drawing Sheets

(51) Int. Cl.
*G06F 3/044* (2006.01)
*G02F 1/1333* (2006.01)
*G02F 1/1368* (2006.01)
*G02F 1/1362* (2006.01)

(52) U.S. Cl.
CPC .. *G02F 1/136213* (2013.01); *G02F 1/136286* (2013.01); *G06F 3/044* (2013.01); *G06F 3/0412* (2013.01); *G06F 3/0416* (2013.01); *G02F 2001/133357* (2013.01); *G09G 2310/0264* (2013.01)

(58) Field of Classification Search
CPC ....... G02F 2001/133357; G06F 3/0412; G06F 3/0416; G06F 3/044; G09G 2310/0264; G09G 3/3648
See application file for complete search history.

(56) References Cited

U.S. PATENT DOCUMENTS

| | | | |
|---|---|---|---|
| 2010/0085282 A1* | 4/2010 | Yu | G09G 3/3233 345/76 |
| 2012/0146978 A1* | 6/2012 | Park | G11C 19/287 345/211 |
| 2016/0224175 A1* | 8/2016 | Moon | G06F 3/0412 |
| 2019/0155433 A1* | 5/2019 | Park | H01L 27/1214 |

* cited by examiner

DISPLAY APPARATUS

CROSS-REFERENCE TO RELATED APPLICATIONS

This application claims the benefit of the Korean Patent Application No. 10-2017-0135316 filed on Oct. 18, 2017, which is hereby incorporated by reference as if fully set forth herein.

BACKGROUND

Field of the Invention

The present disclosure relates to a display apparatus including a touch sensor.

Discussion of the Related Art

With the advancement of information-oriented society, various requirements for display apparatuses for displaying an image are increasing, and various types of display apparatuses such as liquid crystal display (LCD) apparatuses and light emitting display apparatuses are being practically used. In electronic devices including a display apparatus, mobile devices such as mobile phones, smartphones, smart watches, tablet personal computers (PCs), or watch phones and medium and large-sized devices such as smart televisions (TVs), notebook computers, or monitors provide a touch screen type user interface, for convenience of a user input. Display apparatuses capable of touch processing are being developed for providing a larger number of various functions, and requirements of users are being diversified.

Display apparatuses including the touch screen type user interface are driven by a time division driving manner which time-divisionally divides a display driving operation of displaying an image on a display panel and a touch driving operation of sensing a touch position and/or a touch force based on a user touch.

A time division driving type user interface may be classified into a vertical blanking manner, which time-divisionally drives one frame in a display period and a touch sensing period to perform a one-time touch report during the one frame; and a horizontal blanking manner which time-divisionally drives one frame in the display period and the touch sensing period a plurality of times to perform a touch report a plurality of times during the one frame. Thus, the horizontal blanking manner has a touch report rate of 120 Hz or higher, and thus, enhances touch sensitivity in comparison to the vertical blanking manner.

A display apparatus based on the horizontal blanking manner includes a gate driving circuit including a shift register for time division driving. The shift register is embedded (or integrated) into a display panel and includes a plurality of driving stage blocks for display driving and a plurality of holding stage blocks for touch driving.

Each of the driving stage blocks and the holding stage blocks is configured with a stage circuit including a plurality of oxide thin film transistors (TFTs) having mobility which is higher than that of amorphous TFTs, for realizing a thin bezel width of a display apparatus. In comparison with the amorphous TFTs, the oxide TFTs have a problem where deterioration is not recovered. Particularly, the stage circuit of each of the plurality of holding stage blocks holds an output signal of a front driving stage block during the touch sensing period, and due to this, deterioration of the oxide TFTs configuring the stage circuit of each of the plurality of holding stage blocks is accelerated. For this reason, an output signal is not stably held during the touch sensing period, causing a reduction in reliability.

The above-described background is possessed by the inventor of the application for deriving the disclosure, or is technology information that has been acquired in deriving the disclosure. The above-described background is not necessarily known technology disclosed to the general public before the application of the disclosure.

SUMMARY

Accordingly, the present disclosure is directed to provide a display apparatus that substantially obviates one or more problems due to limitations and disadvantages of the related art.

An aspect of the present disclosure is directed to provide a display apparatus including a gate driving circuit, which stably holds an output signal during a touch sensing period.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including a display panel including a display area including a plurality of gate lines, a plurality of data lines, and a plurality of touch sensors, a gate driving circuit dividing the display area into a plurality of horizontal blocks and driving gate lines of a horizontal block by units of horizontal blocks at every display period in one frame, and a touch driving circuit sensing a touch through touch sensors of the horizontal block by units of horizontal blocks at every touch sensing period in the one frame. The gate driving circuit includes a plurality of driving stage groups each including a plurality of driving stages supplying a scan pulse to gate lines included in a corresponding horizontal block at every display period and a plurality of holding stage groups, each holding stage group between two driving stage groups, a holding stage group of the plurality of holding stage groups, between a rear driving stage group and a front driving stage group, including at least one holding stage supplying a carry signal to the rear driving stage group according to a voltage of a first control node and a voltage of a second control node based on first and second node control powers and an output signal supplied from the front driving stage group. Each of the first and second node control powers includes an alternating current (AC) voltage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
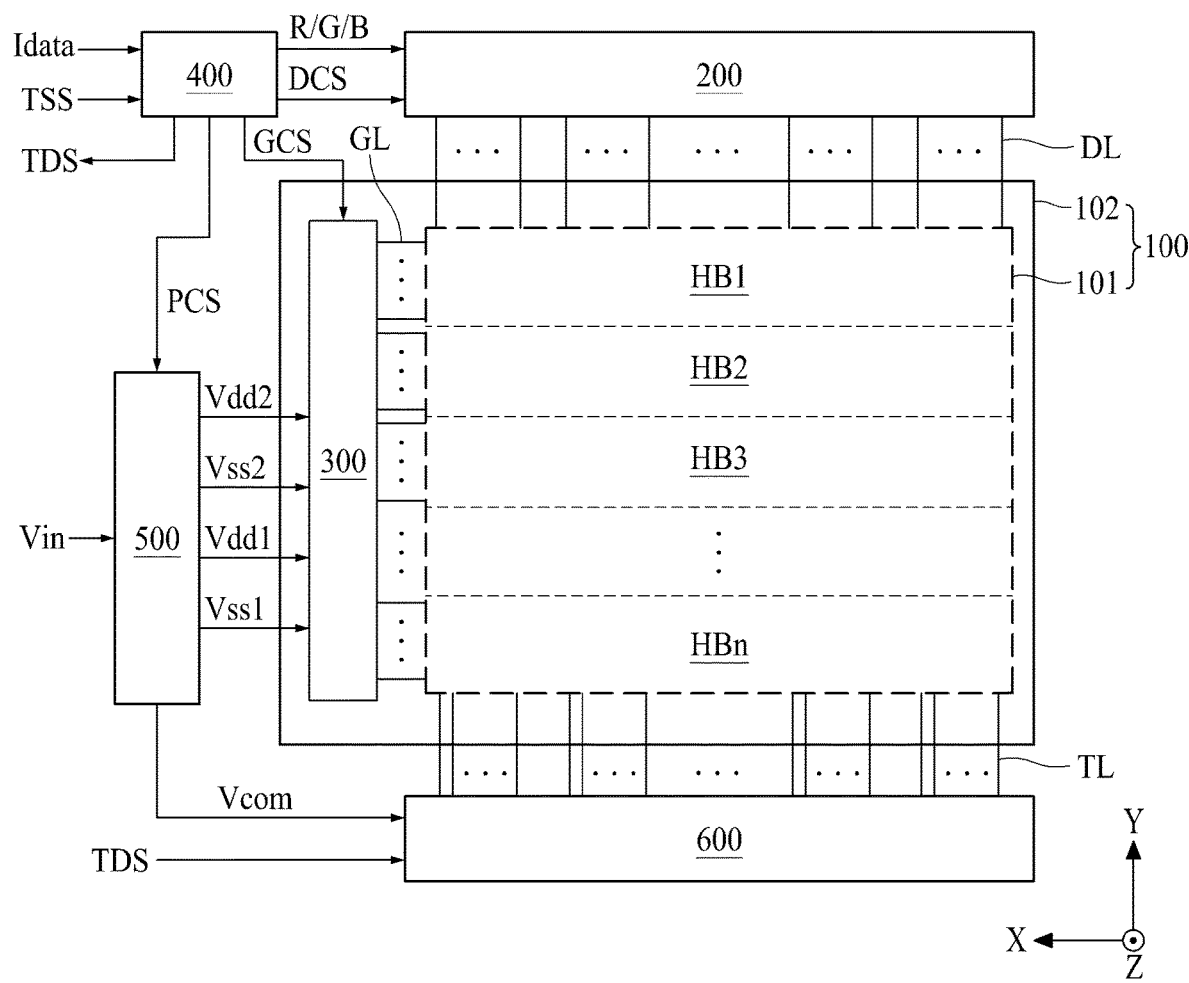
FIG. 1 is a diagram for describing a display apparatus according to an embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements.

Figure 2:
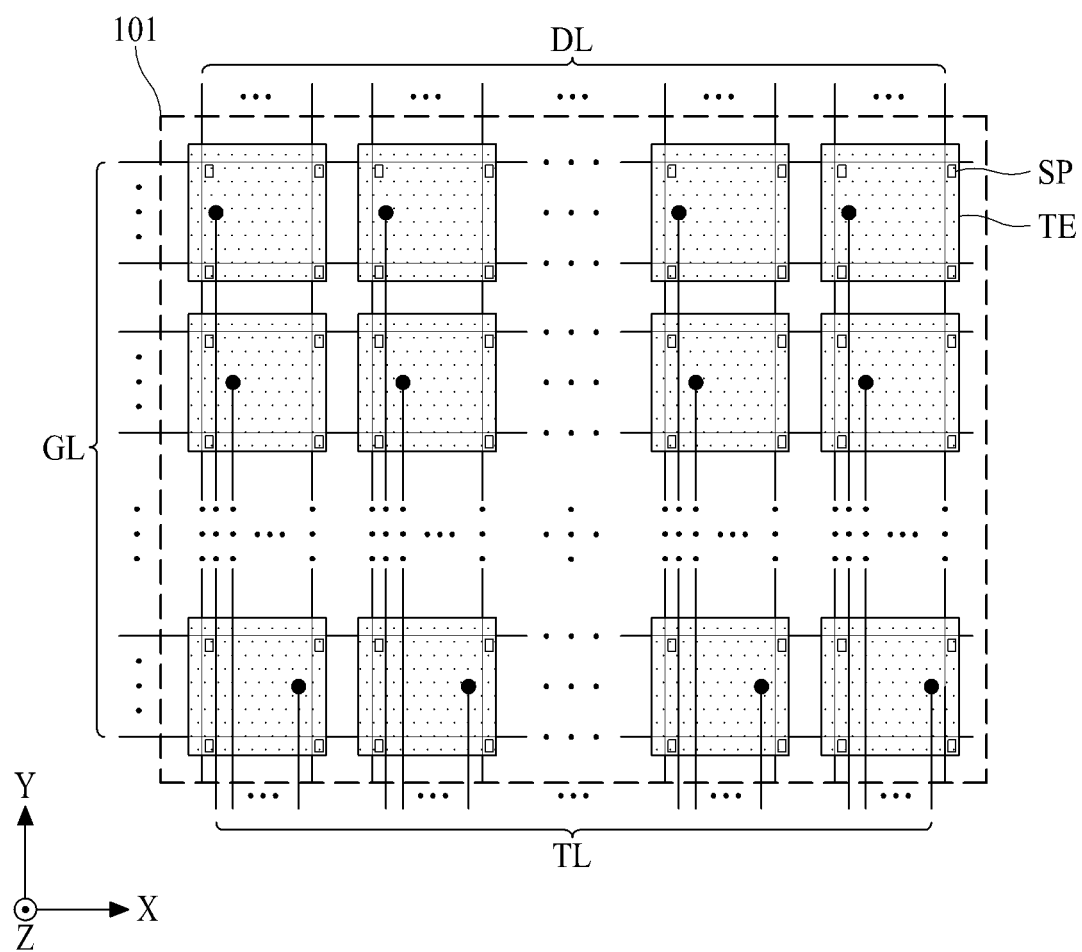
FIG. 2 is a diagram for describing a display area illustrated in FIG. 1.
Figure 3:
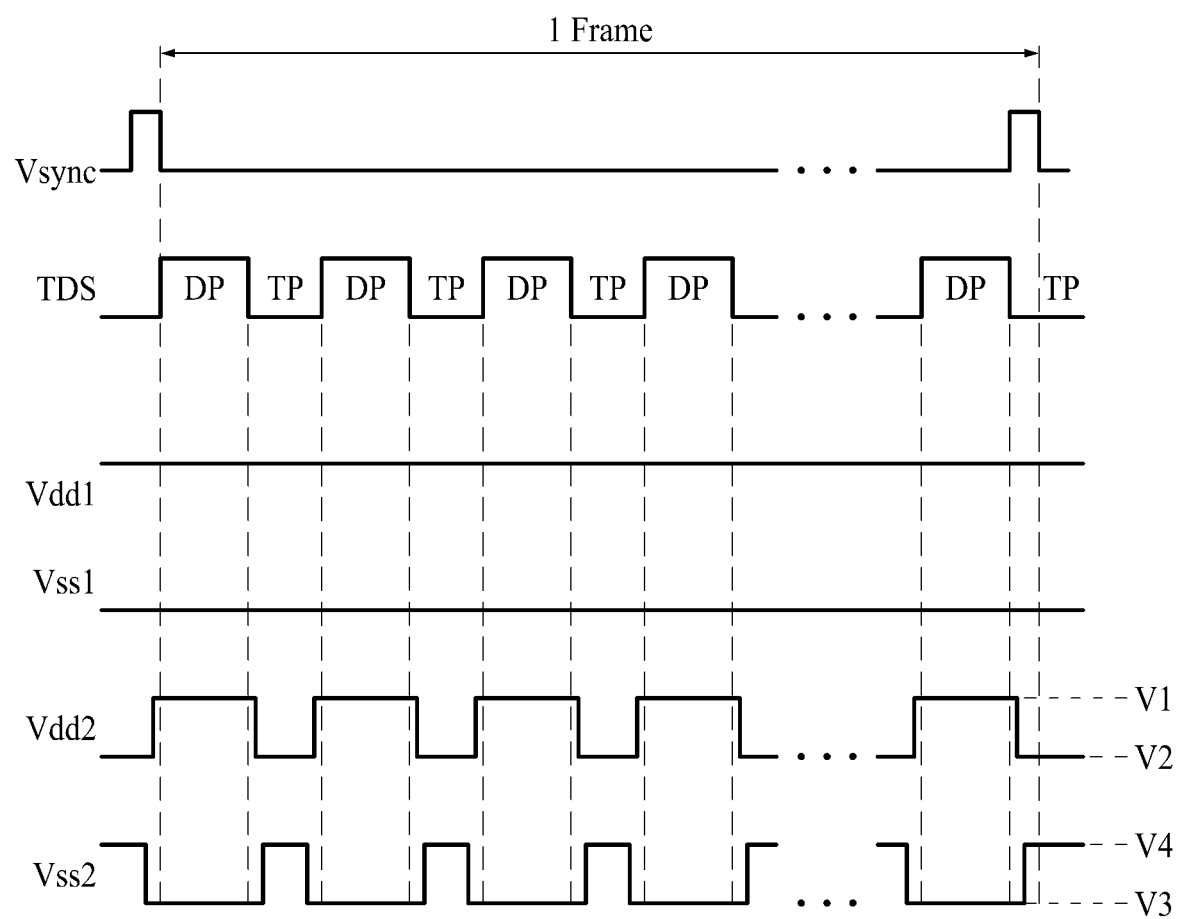
FIG. 3 is a waveform diagram showing a time division driving signal and first and second node control voltages illustrated in FIG. 1.

FIG. 1 is a diagram for describing a display apparatus according to an embodiment of the present disclosure. FIG. 2 is a diagram for describing a display area illustrated in FIG. 1. FIG. 3 is a waveform diagram showing a time division driving signal and first and second node control voltages illustrated in FIG. 1.

Referring to FIGS. 1 to 3, the display apparatus according to an embodiment of the present disclosure may include a display panel 100, a display driving part, and a touch driving circuit 600.

The display panel 100 may be a liquid crystal display panel having an in-cell touch type structure using a capacitive type. For example, the display panel 100 may have an in-cell touch type structure using a self-capacitive type. The display panel 100 may operate in a display mode and a touch sensing mode. For example, the display panel 100 may display an image by using light irradiated from a backlight unit during the display mode and may act as a touch panel for touch sensing during the touch sensing mode. The display mode may be performed in each of a set plurality of display periods in one frame, and the touch sensing mode may be performed in each of a set plurality of touch sensing periods immediately before or after the plurality of display periods in one frame.

The display panel 100 according to an embodiment may include a display area 101 provided on a substrate and a non-display area 102 provided in an edge of the substrate to surround the display area 101.

The display area 101 may include a plurality of data lines DL, a plurality of gate lines GL, a plurality of subpixels SP, a plurality of touch electrodes TE, and a plurality of touch routing lines TL.

Each of the plurality of data lines DL may receive a data signal in the display mode. Each of the plurality of gate lines GL may receive a scan pulse in the display mode. The plurality of data lines DL and the plurality of gate lines GL may be arranged on the substrate to intersect one another, thereby defining a plurality of subpixel areas.

Each of the plurality of subpixels SP may include a thin film transistor (TFT) connected to a gate line GL and a data line DL adjacent thereto, a pixel electrode connected to the TFT, and a storage capacitor connected to the pixel electrode.

The TFT may include a gate terminal, a semiconductor layer, a first terminal, and a second terminal. The first terminal and the second terminal of the TFT may each be defined as a source terminal or a drain terminal, based on the conductive type of the semiconductor layer. The TFT may have a bottom gate structure where the gate terminal is disposed under the semiconductor layer and/or a top gate structure where the gate terminal is disposed on the semiconductor layer. The TFT may be covered by a passivation layer (or a planarization layer).

The pixel electrode may be formed of a transparent conductive material on the passivation layer in a subpixel area and may be connected to the second terminal of the TFT through a via hole provided in the passivation layer.

The storage capacitor may be provided between the second terminal of the TFT and a corresponding touch electrode TE, or may be provided between the pixel electrode and the touch electrode TE. The storage capacitor may be charged with the data signal supplied through the TFT, and when the TFT is turned off, the storage capacitor may hold an electric field generated between the pixel electrode and the touch electrode TE by using a charged voltage.

Each of the plurality of touch electrodes TE may act as a touch sensor for sensing a touch performed by a touch object, or may act as a common electrode for generating an electric field along with the pixel electrode to drive a liquid crystal. That is, each of the plurality of touch electrodes TE may be used as the touch sensor in the touch sensing mode and may be used as the common electrode in the display mode. Also, since each of the plurality of touch electrodes TE is used as the common electrode for driving the liquid crystal, the plurality of touch electrodes TE may be formed of a transparent conductive material such as indium tin oxide (ITO). The touch object may be defined as a user finger or a touch pen such as an active pen.

Since each of the plurality of touch electrodes TE is used as a self-capacitive touch sensor in the touch sensing mode, each of the plurality of touch electrodes TE may have a size which is larger than a minimum contact size between the touch object and the display panel 100. Therefore, each of the plurality of touch electrodes TE may have a size corresponding to a size of one or more subpixels SP.

Each of the plurality of touch routing lines TL may be individually connected to a corresponding touch electrode of the plurality of touch electrodes TE. Each of the plurality of touch routing lines TL may transfer a common voltage Vcom to a corresponding touch electrode TE in the display mode, and in the touch sensing mode, each of the plurality of touch routing lines TL may transfer a touch driving pulse to the corresponding touch electrode TE and may transfer a capacitance variation of the corresponding touch electrode TE to the display driving part.

The display area 101 may be divided into n (where n is a natural number equal to or more than two) number of horizontal blocks (for example, first to nth horizontal blocks) HB1 to HBn. In the display area 101, an image may be displayed or touch sensing may be performed by units of horizontal blocks, based on time division driving. Each of the n horizontal blocks HB1 to HBn according to an embodiment may include i (where i is a natural number equal to or more than two) number of gate lines GL (or horizontal lines), and the i gate lines GL may overlap one touch electrode TE. For example, the first horizontal block HB1 may include first to $i^{th}$ gate lines, and the second horizontal blocks HB2 may include $i+1^{th}$ to $2i^{th}$ gate lines.

The display driving part may time-divisionally drive the n horizontal blocks HB1 to HBn of the display area 101 of the display panel 100 and may include a data driving circuit 200 and a gate driving circuit 300 to drive the subpixels SP by units of horizontal blocks at every first period DP of a time division driving signal TDS.

In the touch mode, the data driving circuit 200 may convert pixel data R/G/B into an analog data signal, based on a data control signal DCS and may supply the analog data signal to the plurality of data lines DL.

The data driving circuit 200 according to an embodiment may supply data signals to subpixels SP of a corresponding horizontal block through the plurality of data lines DL at every first period DP of the time division driving signal TDS.

According to another embodiment, the data driving circuit 200 may supply data signals to subpixels SP of a corresponding horizontal block through the plurality of data lines DL at every first period DP of the time division driving signal TDS and may supply a data load free signal to each of the plurality of data lines DL at every second period TP of the time division driving signal TDS. Here, in the touch sensing mode, the data load free signal may have the same phase as that of the touch driving pulse supplied to the touch electrodes TE, and thus, may decrease loads of the touch electrodes TE caused by parasitic capacitances between the touch electrodes TE and the data lines DL, thereby enhancing touch sensitivity.

In a process of forming TFTs provided in the subpixels SP, the gate driving circuit 300 may be embedded (or integrated) into one non-display area of the display panel 100 and may be connected to the plurality of gate lines GL in a one-to-one relationship. The gate driving circuit 300 may generate a scan pulse and may supply the scan pulse to a corresponding gate line GL in a predetermined order, based on a gate control signal GCS. The scan pulse supplied to each of the gate lines GL may be synchronized with a data signal supplied to a corresponding data line.

The gate driving circuit 300 according to an embodiment may sequentially supply the scan pulse to the i gate lines included in a horizontal block group by units of horizontal blocks at every first period DP of the time division driving signal TDS.

According to another embodiment, the gate driving circuit 300 may sequentially supply the scan pulse to the i gate lines included in the horizontal block group by units of horizontal blocks at every first period DP of the time division driving signal TDS and may supply a gate load free signal to each of the plurality of gate lines GL in the touch sensing mode, for example, at every second period TP of the time division driving signal TDS. Here, in the touch sensing mode, the gate load free signal may have the same phase as that of the touch driving pulse supplied to the touch electrodes TE, and thus, may decrease loads of the touch electrodes TE caused by parasitic capacitances between the touch electrodes TE and the gate lines GL, thereby enhancing touch sensitivity.

The display driving part according to the present disclosure may further include a timing control circuit 400 and a power generation circuit 500.

The timing control circuit 400 may receive a timing synchronization signal TSS and input data Idata supplied from a host controller (or a host system) and may align the input data Idata to generate pixel data R/G/B suitable for the time division driving of the display panel 100, based on the timing synchronization signal TSS and may supply the pixel data R/G/B to the data driving circuit 200.

The timing control circuit 400 may generate the time division driving signal TDS for time-divisionally driving the display panel 100 by units of horizontal blocks, based on the timing synchronization signal TSS. The time division driving signal TDS according to an embodiment may include the first period DP and the second period TP which are each performed twice or more during one frame, based on a vertical synchronization signal of the timing synchronization signal TSS. The time division driving signal TDS may be generated in order for the second period TP to start prior to the first period DP. Here, the first period DP of the time division driving signal TDS may be defined as a display period, and the second period TP of the time division driving signal TDS may be defined as a touch sensing period.

Moreover, the timing control circuit 400 may generate a power control signal PCS for controlling, in an alternating current (AC) form, first and second node control powers Vdd2 and Vss2 which are to be supplied to the gate driving circuit 300, based on the time division driving signal TDS and may supply the power control signal PCS to the power generation circuit 500. Also, the timing control circuit 400 may generate and output the data control signal DCS and the gate control signal GCS, based on the timing synchronization signal TSS and the time division driving signal TDS. Here, the data control signal DCS may include a source start signal, a source shift signal, a source enable signal, and a polarity control signal. Also, the gate control signal GCS may include first to fourth gate start signals, first to eighth gate shift clocks, first to fourth scan holding clocks, and first to fourth stage reset clocks.

Optionally, the time division driving signal TDS may be generated by the host controller (or the host system) and may be provided to the timing control circuit 400.

The power generation circuit 500 may generate and output various power signals such as a circuit driving voltage and a driving power necessary for driving of the display apparatus, based on an input power Vin. Particularly, the power generation circuit 500 according to the present disclosure may generate a first driving power Vdd1 having a first driving voltage and a second driving power Vss1 having a second driving voltage, based on the input power Vin and may supply the first driving power Vdd1 and the second driving power Vss1 to the gate driving circuit 300, and in response to the power control signal PCS supplied from the timing control circuit 400, the power generation circuit 500 may generate the first node control power Vdd2 corresponding to an AC voltage (or an AC form) and may supply the first node control power Vdd2 to the gate driving circuit 300. Furthermore, in response to the power control signal PCS supplied from the timing control circuit 400, the power generation circuit 500 according to the present disclosure may generate the second node control power Vss2 corresponding to an AC voltage (or an AC form) and may supply the second node control power Vss2 to the gate driving circuit 300.

The first driving power Vdd1 according to an embodiment may be set to a constant voltage level of 20V, but is not limited thereto.

The second driving power Vss1 according to an embodiment may be set to a constant voltage level of −10V, but is not limited thereto. The second driving power Vss1 may be used as a gate-off voltage for turning off a TFT provided in each of the pixels.

The first node control power Vdd2 according to an embodiment may have a first node control voltage having a first voltage level V1 during the first period DP of the time division driving signal TDS, and the first node control power Vdd2 may have a first node control voltage having a second voltage level V2 which is lower than the first voltage level V1 during the second period TP of the time division driving signal TDS. For example, the first voltage level V1 may be set to 20V, and the second voltage level V2 may be set to −10V. However, the present embodiment is not limited thereto.

The second node control power Vss2 according to an embodiment may have a second node control voltage having a third voltage level V3 during the first period DP of the time division driving signal TDS, and the second node control power Vss2 may have a second node control voltage having a fourth voltage level V4 which is higher than the third voltage level V3 during the second period TP of the time division driving signal TDS. For example, the third voltage level V3 may be set to −10 V, and the fourth voltage level V4 may be set to 20 V. However, the present embodiment is not limited thereto.

The power generation circuit 500 according to the present disclosure may be implemented with a power management integrated circuit (IC).

Additionally, the power generation circuit 500 according to the present disclosure may further include a common voltage generation circuit which generates the common voltage Vcom, a touch driving pulse generation circuit which generates the touch driving pulse, a first load free signal generation circuit which generates the data load free signal, and a second load free signal generation circuit which generates the gate load free signal. Here, the common voltage generation circuit and the touch driving pulse generation circuit may be embedded into the touch driving circuit 600. The common voltage generation circuit, the touch driving pulse generation circuit, the first load free signal generation circuit, and the second load free signal generation circuit may be implemented as a touch power IC.

The touch driving circuit 600 may be connected to the plurality of touch electrodes TE through the plurality of touch routing lines TL provided in the display panel 100. In the display mode based on the first period DP of the time division driving signal TDS supplied from the timing control circuit 400, the touch driving circuit 600 may supply the common voltage Vcom to the plurality of touch electrodes TE through the plurality of touch routing lines TL. Also, the touch driving circuit 400 may sense a touch, performed by the touch object, through touch electrodes TE of a horizontal block by units of horizontal blocks according to the second period TP of the time division driving signal TDS.

In the touch sensing mode based on the second period TP of the time division driving signal TDS, the touch driving circuit 600, according to an embodiment, may supply the touch driving pulse to the plurality of touch electrodes TE through the plurality of touch routing lines TL, and then, may sense a capacitance variation of a corresponding touch electrode TE through each of the plurality of touch routing lines TL to generate touch raw data and may provide the generated touch raw data to the host controller (or the host system).

According to another embodiment, in the touch sensing mode based on the second period TP of the time division driving signal TDS, the touch driving circuit 600 may sense a pen touch in a pen sensing period and may sense a finger touch in a finger touch period. For example, the touch driving circuit 600 may supply an uplink signal including a touch pen synchronization signal to touch electrodes TE of a corresponding horizontal block at every pen sensing period set in some of a set plurality of second periods TP in one frame and may sense a signal transmitted from the touch pen through corresponding touch electrodes TE to generate touch raw data corresponding to a pen touch position. The touch pen may receive the touch pen synchronization signal through a conductive tip and may transmit a downlink signal including pen position data to the display panel 100, based on the received touch pen synchronization signal. Also, the touch driving circuit 600 may supply the touch driving pulse to touch electrodes TE of a corresponding horizontal block at every finger sensing period set in the other periods of the set plurality of second periods TP in one frame and may sense a capacitance variation of a corresponding touch electrode TE to generate touch raw data corresponding to a finger touch position.

The host controller may receive touch raw data supplied from the touch driving circuit 600, generate two-dimensional (2D) or three-dimensional (3D) touch coordinate information from the touch raw data by executing a predetermined algorithm, and execute an application corresponding to the touch coordinate information. Here, the host controller may be a micro controller unit (MCU) or an application processor.

Figure 4:
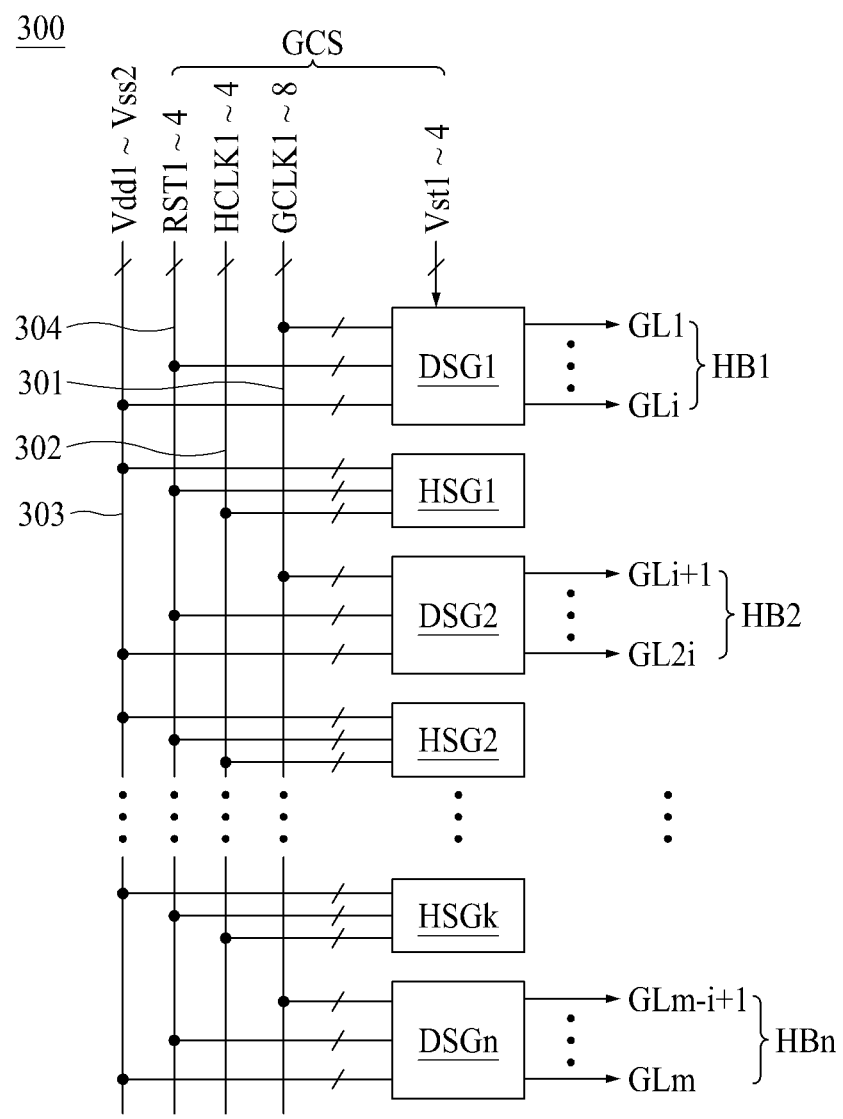
FIG. 4 is a diagram for describing a gate driving circuit according to an embodiment of the present disclosure.
Figure 5:
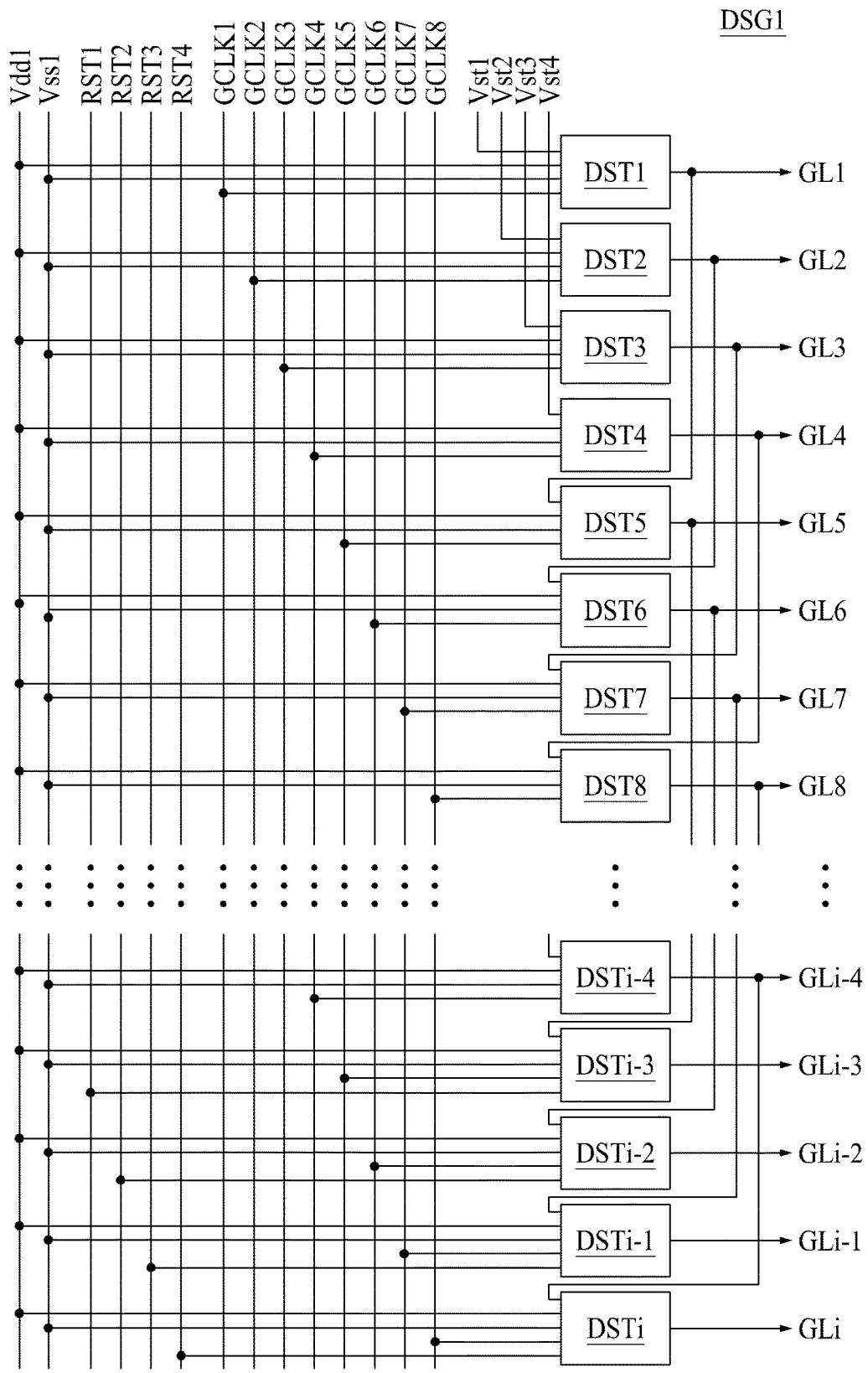
FIG. 5 is a diagram for describing a first driving stage group according to an embodiment illustrated in FIG. 4.
Figure 6:
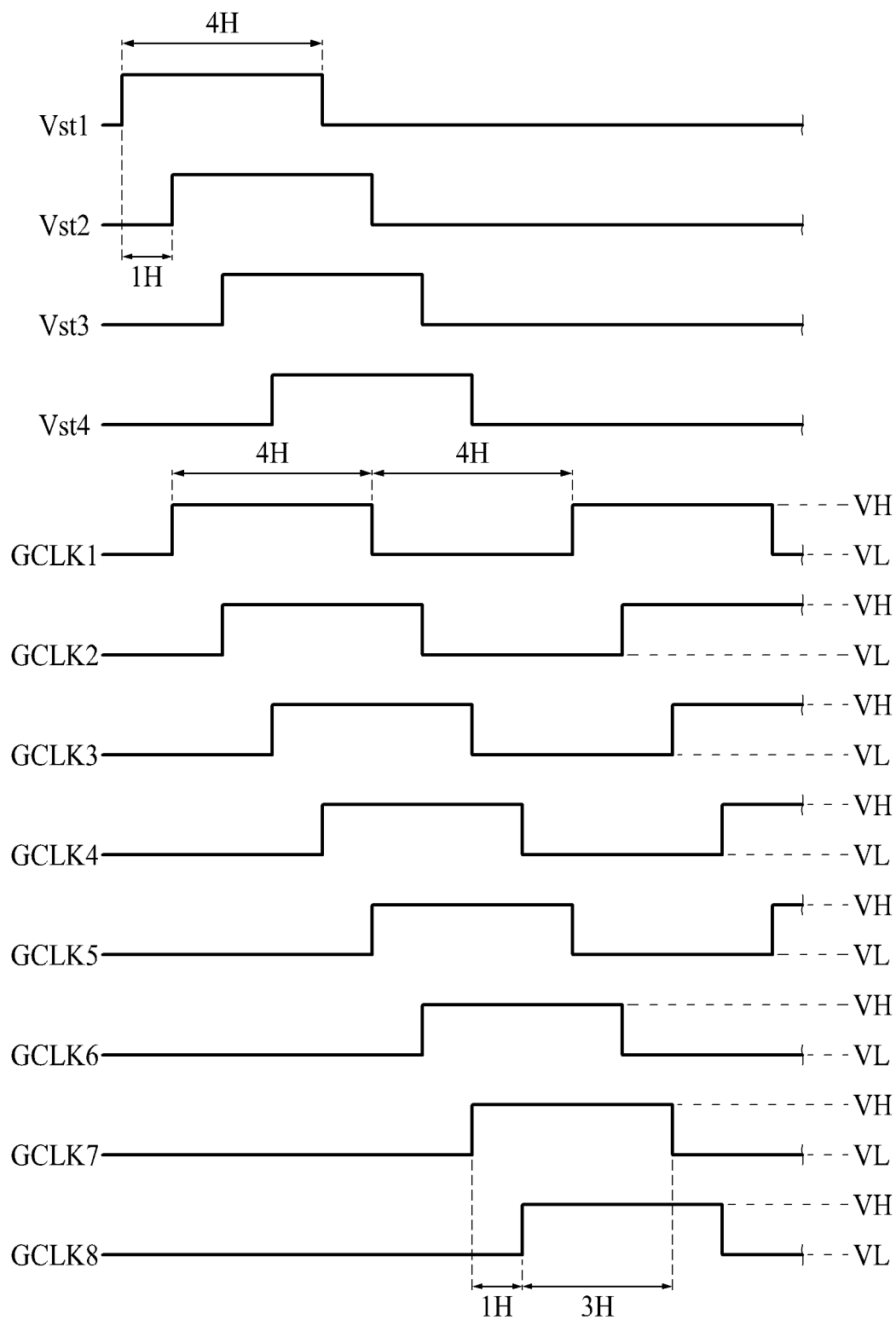
FIG. 6 is a waveform diagram showing a plurality of gate start signals and a plurality of gate shift clocks illustrated in FIG. 4.
Figure 7:
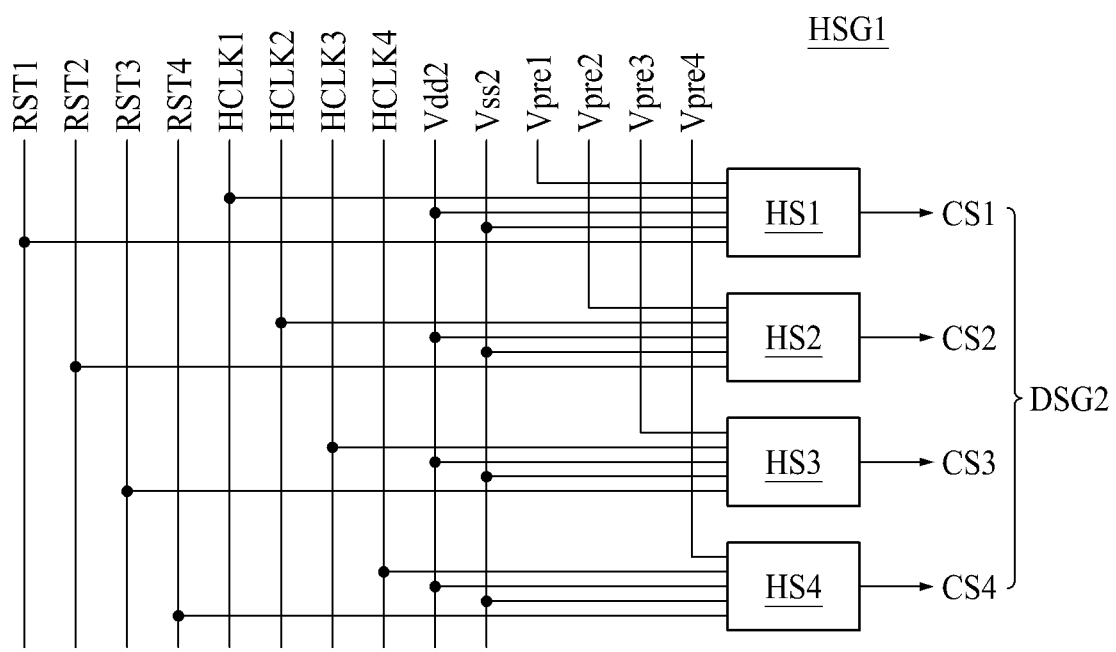
FIG. 7 is a diagram for describing a first holding stage group according to an embodiment illustrated in FIG. 4.

FIG. 4 is a diagram for describing a gate driving circuit 300 according to an embodiment of the present disclosure. FIG. 5 is a diagram for describing a first driving stage group according to an embodiment illustrated in FIG. 4. FIG. 6 is a waveform diagram showing a plurality of gate start signals and a plurality of gate shift clocks illustrated in FIG. 4. FIG. 7 is a diagram for describing a first holding stage group according to an embodiment illustrated in FIG. 4.

Referring to FIGS. 4 to 7, the gate driving circuit 300 according to an embodiment of the present disclosure may include n number of driving stage groups DSG1 to DSGn, k (where k is a natural number equal to "n−1") number of holding stage groups HSG1 to HSGk, a shift clock line part 301, a scan holding clock line part 302, a power line part 303, and a reset clock line part 304.

Each of the n driving stage groups DSG1 to DSGn may sequentially supply a scan pulse to i number of gate lines GL included in a corresponding horizontal block of horizontal blocks HB1 to HBn during a first period of a time division driving signal. Each of the n driving stage groups DSG1 to DSGn according to an embodiment may include i number of driving stages DST1 to DSTi. In this case, the gate driving circuit 300 may include a number of driving stages corresponding to the total number of gate lines.

Each of the i driving stages DST1 to DSTi may include an output node connected to each of the i gate lines GL. For example, first to $i^{th}$ driving stages DST1 to DSTi of a first driving stage group DSG1 may be respectively connected to first to $i^{th}$ gate lines GL1 to GLi.

Each of first to fourth driving stages DST1 to DST4 may be enabled by a corresponding gate start signal of first to fourth gate start signals Vst1 to Vst4 and may supply, as the scan pulse, a corresponding gate shift clock of first to fourth gate shift clocks GCLK1 to GCLK4 to each of first to fourth gate lines GL1 to GL4. Also, each of the first to fourth driving stages DST1 to DST4 may be reset by an output signal of a corresponding driving stage of fifth to eighth driving stages DST5 to DST8.

For each $j^{th}$ driving stage (DSTj) of the fifth to i−$4^{th}$ driving stages DST5 to DSTi-4 may be enabled by an output signal (GLj-4) of a corresponding previous fourth driving stage (DSTj-4) and may supply, as the scan pulse, a corresponding gate shift clock GCLK to each of fifth to i−$4^{th}$ gate lines GL5 to GLi-4. Also, each of the fifth to i−$4^{th}$ driving stages DST5 to DSTi-4 may be reset by an output signal of a corresponding next fourth driving stage.

For each $j^{th}$ driving stage (DSTj) of the i−$3^{rd}$ to $i^{th}$ driving stages DSTi-3 to DSTi may be enabled by an output signal (GLj-4) of a corresponding previous fourth driving stage (DSTj-4) and may supply, as the scan pulse, a corresponding gate shift clock GCLK to each of i−$3^{rd}$ to $i^{th}$ gate lines GLi-3 to GLi. Also, the i−$3^{rd}$ to $i^{th}$ driving stages DSTi-3 to DSTi may be respectively reset by corresponding first to fourth stage reset clocks RST1 to RST4. For example, i−$3^{rd}$ and i−$2^{nd}$ driving stages DSTi-3 and DSTi-2 may be simultaneously reset by the second stage reset clock RST2, and i−$1^{st}$ to $i^{th}$ driving stages DSTi-1 to DSTi may be simultaneously reset by the fourth stage reset clock RST4. As another example, the i−$3^{rd}$ and i−$1^{st}$ driving stages DSTi-3 and DSTi-1 may be simultaneously reset by the second stage reset clock RST2, and the i−$2^{nd}$ to $i^{th}$ driving stages DSTi-2 to DSTi may be simultaneously reset by the fourth stage reset clock RST4.

An output signal of each of the first to $i^{th}$ driving stages DST1 to DSTi may be supplied as a gate start signal of a next fourth driving stage. An output signal of each of the fifth to $i^{th}$ driving stages DST5 to DSTi may be supplied as a stage reset signal of a previous fourth driving stage.

Each of the k holding stage groups HSG1 to HSGk may be disposed between the n driving stage groups DSG1 to DSGn, and during a second period (TP) of the time division driving signal, an $h^{th}$ holding stage group HSGh (h between 1 and k inclusive) from the k holding stage groups HSG1 to HSGk may sequentially supply four carry signals CS1 to CS4 to the h+$1^{th}$ driving stage group DSGh+1 following the $h^{th}$ holding stage group according to a voltage of a first control node and a voltage of a second control node, which are based on a first node control power Vdd2, a second node control power Vss2, and an input voltage including four output signals Vpre1 to Vpre4 supplied from the $h^{th}$ driving stage group DSGh preceding the $h^{th}$ holding stage group. The four carry signals CS1 to CS4 may be respectively applied as gate start signals Vst1 to Vst4 to first to fourth driving stages of the rear driving stage group. For example, four carry signals CS1 to CS4 sequentially output from a first holding stage group HSG1 may be respectively applied as first to fourth gate start signals Vst1 to Vst4 to first to fourth driving stages of a second driving stage group DSG2. Also, four carry signals CS1 to CS4 sequentially output from a $k^{th}$ holding stage group HSGk may be respectively applied as first to fourth gate start signals Vst1 to Vst4 to first to fourth driving stages of an $n^{th}$ driving stage group DSGn.

Each of the k holding stage groups HSG1 to HSGk may include first to fourth holding stages HS1 to HS4.

Each of the first to fourth holding stages HS1 to HS4 may be enabled by a corresponding output signal of four output signals Vpre1 to Vpre4 supplied from a driving stage group preceding the holding stage group and may supply, as carry signals CS1 to CS4, a corresponding scan holding clock of first to fourth scan holding clocks HCLK1 to HCLK4 to a corresponding driving stage of first to fourth driving stages of each of a driving stage groups following the holding stage group. Also, each of the first to fourth holding stages HS1 to HS4 may be reset by a corresponding output signal of output signals of the first to fourth driving stages of the driving stage groups following the holding stage group.

Each of the first to fourth holding stages HS1 to HS4 according to an embodiment may include an output node sequentially connected to the first to fourth driving stages of each of the rear driving stage groups DSG2 to DSGn. For example, the first holding stage HS1 of each of the k holding stage groups HSG1 to HSGk may be connected to the first driving stage of each of the driving stage groups DSG2 to DSGn following each of the holding stage groups HSG1 to HSGk, and the fourth holding stage HS4 of each of the k holding stage groups HSG1 to HSGk may be connected to the fourth driving stage of each of the driving stage groups DSG2 to DSGn following each of the holding stage groups HSG1 to HSGk.

The shift clock line part 301 may include first to eighth shift clock lines which are supplied with first to eighth gate shift clocks GCLK1 to GCLK8 having a sequentially shifted phase from the timing control circuit. In this case, a $j^{th}$ (where j is a natural number from one to eight) shift clock line may be connected to an $8a\text{-}b^{th}$ (where a is a natural number, and b is a natural number equal to "$8\text{-}j$") driving stage DST$8a\text{-}b$. Therefore, a $i^{th}$ gate shift clock may be supplied to the $8a\text{-}b^{th}$ driving stage DST$8a\text{-}b$ through the $j^{th}$ shift clock line.

Each of the first to eighth gate shift clocks GCLK1 to GCLK8 may include a first voltage period and a second voltage period which are repeated at a predetermined interval. Here, the first voltage period may have a high voltage level VH for turning on a transistor, and the second voltage period may have a low voltage level VL for turning off a transistor. The first voltage period and the second voltage period of each of the first to eighth gate shift clocks GCLK1 to GCLK8 may each have four horizontal periods. The first voltage period of each of the first to eighth gate shift clocks GCLK1 to GCLK8 may be shifted by one horizontal period, and thus, may overlap a first voltage period of an adjacent gate shift clock during three horizontal periods 3H.

The scan holding clock line part 302 may include first to fourth scan holding clock lines which are supplied with first to fourth scan holding clocks HCLK1 to HCLK4 having a sequentially shifted phase from the timing control circuit. In this case, each of the first to fourth scan holding clock lines may be connected to a corresponding holding stage of the first to fourth holding stages HS1 to HS4 of each of the k holding stage groups HSG1 to HSGk. Therefore, each of the first to fourth scan holding clocks HCLK1 to HCLK4 may be supplied to a corresponding holding stage of the first to fourth holding stages HS1 to HS4 of each of the k holding stage groups HSG1 to HSGk.

Each of the first to fourth scan holding clocks HCLK1 to HCLK4 may rise from a low voltage level VL to a high voltage level VH immediately after the second period of the time division driving signal ends or at a start time of the first period of the time division driving signal, and after a predetermined period, may fall from the high voltage level VH to the low voltage level VL. In this case, each of the first to fourth scan holding clocks HCLK1 to HCLK4 may be generated once immediately after each of a plurality of second periods included in the time division driving signal ends or at a start time of each of a plurality of first periods included in the time division driving signal, in one frame period. For example, each of the first to fourth scan holding clocks HCLK1 to HCLK4 may be generated immediately after each of a plurality of touch sensing periods ends or at a start time of each of a plurality of display periods, and may be shifted by one horizontal period.

A high voltage level VH of each of the first to fourth scan holding clocks HCLK1 to HCLK4 according to an embodiment may have a pulse width corresponding to four horizontal periods (4H) equal to a gate start signal Vst. Each of the first to fourth scan holding clocks HCLK1 to HCLK4 may be defined as a signal which determines an output timing of the scan pulse (or an output signal) in each of the first to fourth driving stages of each of the second to $n^{th}$ driving stage groups DSG2 to DSGn, and thus, may be generated immediately after the touch sensing period ends or at an initial stage of the display period. For example, when each of the first to fourth scan holding clocks HCLK1 to HCLK4 is generated in the touch sensing period, the scan pulse may be output from the second to $n^{th}$ driving stage groups DSG2 to DSGn, and before the touch sensing period ends, the touch sensing period may be changed to the display period. For this reason, the touch sensing period is reduced, and due to this, touch sensing performed on a horizontal block may not be completed.

The power line part 303 may include first to fourth power lines which are supplied with a first driving power Vdd1, a second driving power Vss1, the first node control power Vdd2, and the second node control power Vss2 from the power generation circuit.

The first driving power Vdd1 may be supplied to, through the first power line, the driving stages included in each of the n driving stage groups DSG1 to DSGn and the holding stages included in each of the k holding stage groups HSG1 to HSGk.

The second driving power Vss1 may be supplied to, through the second power line, the driving stages included in each of the n driving stage groups DSG1 to DSGn and the holding stages included in each of the k holding stage groups HSG1 to HSGk. Additionally, the second driving power Vss1 may be changed to a gate load free signal during the touch sensing period, and at this time, the gate load free signal may have a voltage level lower than a second driving voltage of the second driving power Vss1 and may have the same phase as that of a touch driving pulse.

The first node control power Vdd2 may be supplied to, through the third power line, the holding stages included in each of the k holding stage groups HSG1 to HSGk.

The second node control power Vss2 may be supplied to, through the fourth power line, the holding stages included in each of the k holding stage groups HSG1 to HSGk.

The reset clock line part 304 may include first to fourth reset clock lines which are supplied with the first to fourth stage reset clocks RST1 to RST4 having a sequentially shifted phase from the timing control circuit. In this case, each of the first to fourth reset clock lines may be connected to a corresponding driving stage of the $i\text{-}3^{th}$ to $i^{th}$ driving stages DSTi-3 to DSTi of each of the n driving stage groups DSG1 to DSGn and may be connected to a corresponding holding stage of the first to fourth holding stages HS1 to HS4 of each of the k holding stage groups HSG1 to HSGk. Therefore, each of the first to fourth stage reset clocks RST1 to RST4 may be supplied to a corresponding driving stage of the i-3$^{th}$ to i$^{th}$ driving stages DSTi-3 to DSTi of each of then driving stage groups DSG1 to DSGn and may be supplied to a corresponding holding stage of the first to fourth holding stages HS1 to HS4 of each of the k holding stage groups HSG1 to HSGk.

Each of the first to fourth stage reset clocks RST1 to RST4 may have a high voltage level VH and a low voltage level VL. In this case, the high voltage level VH of each of the first to fourth stage reset clocks RST1 to RST4 may have a pulse width which is equal to or wider than that of the gate start signal Vst having four horizontal periods (4H). The first stage reset clock RST1 may rise from the low voltage level VL to the high voltage level VH before the second node control power Vss2 rises from the third voltage level to the fourth voltage level, in the second period of the time division driving signal. That is, a rising time of the first stage reset clock RST1 may be before a rising time of the second node control power Vss2. In more detail, the rising time of the first stage reset clock RST1 may be set to a time between a falling time of the first node control power Vdd2 and a rising time of the second node control power Vss2.

Figure 8:
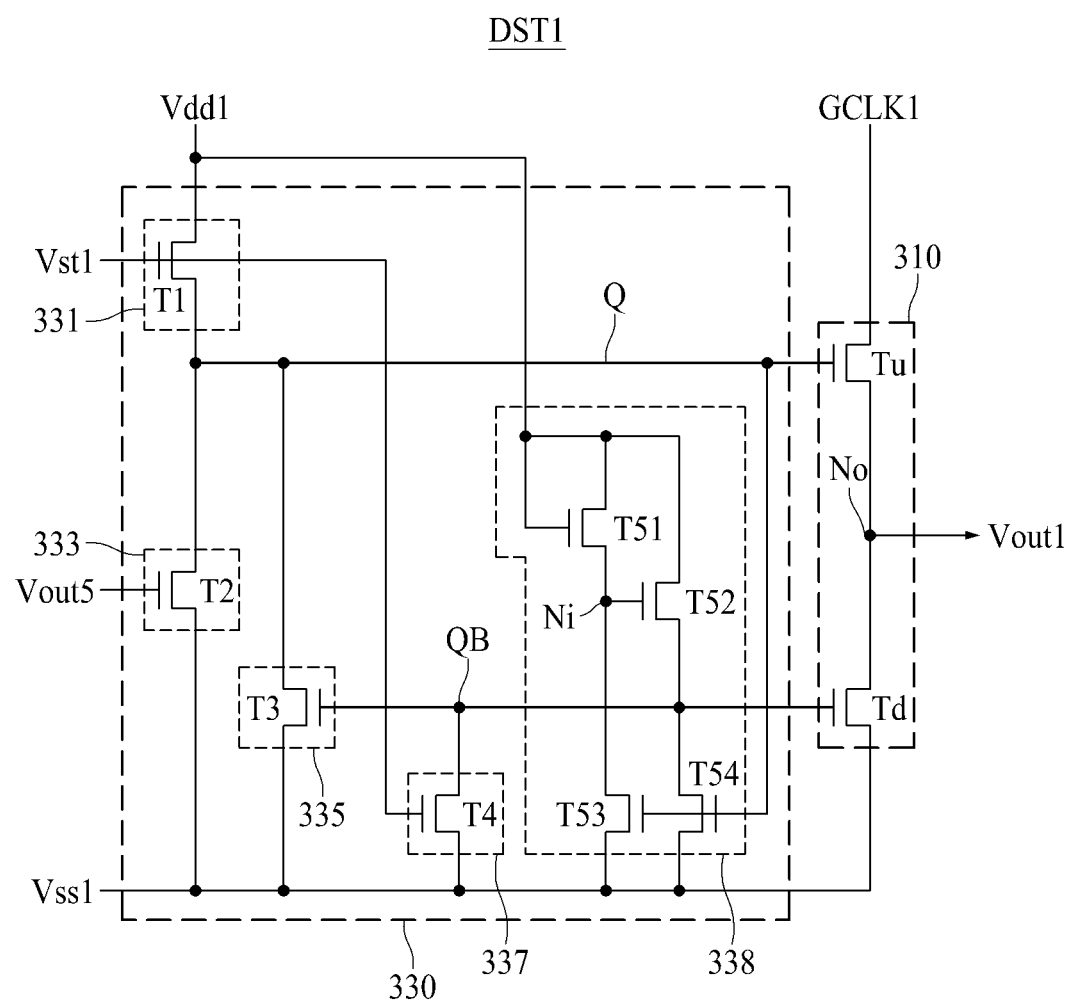
FIG. 8 is a diagram for describing an internal configuration of a first driving stage illustrated in FIG. 5.

FIG. 8 is a diagram for describing an internal configuration of the first driving stage DST1 illustrated in FIG. 5.

Referring to FIGS. 5 and 8, the first driving stage DST1 according to the present embodiment may include a scan output part 310 and a scan node controller 330.

The scan output part 310 may output a first scan pulse Vout1, based on a voltage of each of a first node Q and a second node QB. The scan output part 310 according to an embodiment may include a pull-up TFT Tu and a pull-down TFT Td.

The pull-up TFT Tu may include a gate terminal connected to the first node Q, a first terminal receiving the first gate shift clock GCLK1, and a second terminal connected to an output node No. The pull-up TFT Tu may be turned on based on the voltage of the first node Q and may output a high voltage level VH of the first gate shift clock GCLK1 as the first scan pulse Vout1. The first scan pulse Vout1 may be supplied to a first gate line, and simultaneously, may be supplied as a gate start signal of a fifth driving stage.

The pull-down TFT Td may include a gate terminal connected to the second node QB, a first terminal receiving the second driving power Vss1, and a second terminal connected to the output node No. The pull-down TFT Td may be turned on based on the voltage of the second node QB and may supply the second driving power Vss1 as a gate-off voltage to the first gate line through the output node No. That is, the pull-down TFT Td may be turned on based on the voltage of the second node QB and may discharge a voltage of the first gate line to the second driving power Vss1.

The scan node controller 330 may control the voltage of each of the first node Q and the second node QB, based on the first gate start pulse Vst1, an output signal Vout5 of the fifth driving stage, the first driving power Vdd1, and the second driving power Vss1. The scan node controller 330 according to an embodiment may include a node set circuit 331, a first reset circuit 333, a noise removal circuit 335, a second reset circuit 337, and a charging/discharging circuit 338.

The node set circuit 331 may control the voltage of the first node Q in response to the first gate start pulse Vst1. The node set circuit 331 according to an embodiment may include a first TFT T1. The first TFT T1 may include a gate terminal receiving the first gate start pulse Vst1, a first terminal connected to the first driving power Vdd1, and a second terminal connected to the first node Q. The first TFT T1 may be turned on by the first gate start pulse Vst1 and may charge the first driving voltage of the first driving power Vdd1 into the first node Q.

The first reset circuit 333 may control the voltage of the first node Q in response to the output signal Vout5 of the fifth driving stage. The first reset circuit 333 according to an embodiment may include a second TFT T2. The second TFT T2 may include a gate terminal receiving the output signal Vout5 of the fifth driving stage, a first terminal connected to the second driving power Vss1, and a second terminal connected to the second node QB. The second TFT T2 may be turned on by the output signal Vout5 of the fifth driving stage and may discharge the voltage of the first node Q to the second driving power Vss1.

The noise removal circuit 335 may control the voltage of the first node Q in response to the voltage of the second node QB. The noise removal circuit 335 according to an embodiment may include a third TFT T3. The third TFT T3 may include a gate terminal connected to the second node QB, a first terminal connected to the second driving power Vss1, and a second terminal connected to the first node Q. The third TFT T3 may be turned on by the voltage of the second node QB and may discharge the voltage of the first node Q to the second driving power Vss1. The third TFT T3 may discharge the voltage of the first node Q to the second driving power Vss1 while the pull-up TFT Tu of the scan output part 310 maintains a turn-off state, and thus, may remove noise, which occurs in the first node Q due to coupling between a gate electrode and a source electrode of the pull-up TFT Tu, at every rising period of the first gate shift clock GCLK1 supplied to the pull-up TFT Tu.

The second reset circuit 337 may control the voltage of the second node QB in response to the first gate start pulse Vst1. The second reset circuit 337 according to an embodiment may include a fourth TFT T4. The fourth TFT T4 may include a gate terminal receiving the first gate start pulse Vst1, a first terminal connected to the second driving power Vss1, and a second terminal connected to the second node QB. The fourth TFT T4 may be turned on by the first gate start pulse Vst1 and may discharge the voltage of the second node QB to the second driving power Vss1.

The charging/discharging circuit 338 may control the voltage of the second node QB in response to the voltage of the first node Q. That is, the charging/discharging circuit 338 may charge the first driving power Vdd1 into the second node QB in response to the voltage of the first node Q, or may discharge the voltage of the second node QB to the second driving power Vss1. The charging/discharging circuit 338 according to an embodiment may include TFTs T51 to T54. The charging/discharging circuit 338 may be referred as an inverter circuit which controls the voltage of the second node QB to a voltage opposite to the voltage of the first node Q.

TFT T51 may include a gate terminal and a first terminal connected to the first driving power Vdd1 and a second terminal connected to an internal node Ni. TFT T51 may be turned on by the first driving power Vdd1 and may supply the first driving voltage of the first driving power Vdd1 to the internal node Ni.

TFT T52 may include a gate terminal connected to the internal node Ni, a first terminal connected to the first driving power Vdd1, and a second terminal connected to the second node QB. TFT T52 may be turned on/off based on a voltage of the internal node Ni, and when TFT T52 is turned on, TFT T52 may supply the first driving voltage of the first driving power Vdd1 to the second node QB.

TFT T53 may include a gate terminal connected to the first node Q, a first terminal connected to the second driving power Vss1, and a second terminal connected to the internal node Ni. TFT T53 may be turned on/off based on the voltage of the first node Q, and when TFT T53 is turned on, TFT T53 may discharge the voltage of the internal node Ni to the second driving power Vss1.

TFT T54 may include a gate terminal connected to the first node Q, a first terminal connected to the second driving power Vss1, and a second terminal connected to the second node QB. TFT T54 may be turned on/off based on the voltage of the first node Q, and when TFT T54 is turned on, TFT T54 may discharge the voltage of the second node QB to the second driving power Vss1.

When each of TFT T53 and TFT T54 is turned off based on the voltage of the first node Q, the charging/discharging circuit 338 may charge the first driving power Vdd1 into the internal node Ni through TFT T51 turned on by the first driving power Vdd1 and may charge the first driving voltage of the first driving power Vdd1 into the second node QB through TFT T52 turned on by the voltage of the internal node Ni. When each of TFT T53 and TFT T54 is turned on based on the voltage of the first node Q, the charging/discharging circuit 338 may discharge the voltage of the internal node Ni to the second driving power Vss1 through the turned-on TFT T53 to turn off TFT T52, and simultaneously, may discharge the voltage of the second node QB to the second driving power Vss1 through the turned-on TFT T54. At this time, even when the first driving voltage of the first driving power Vdd1 is supplied to the internal node Ni through TFT T51 turned on by the first driving power Vdd1, the voltage of the internal node Ni may be discharged to the second driving power Vss1 through the turned-on TFT T53, and thus, TFT T52 connected to the internal node Ni may be turned off. In some embodiments, TFT T53 may have a channel size which is relatively larger than that of TFT T51.

Each of the TFTs configuring the first driving stage DST1 according to the present embodiment may include an oxide semiconductor layer such as zinc oxide (ZnO), indium zinc oxide (InZnO), or indium gallium zinc oxide (InGaZnO).

Hereinafter, an operation of the first driving stage DST1 according to the present embodiment will be described with reference to FIGS. 6 and 8.

First, when the first gate start pulse Vst1 is supplied, the first TFT T1 of the node set circuit 331 may be turned on by the first gate start pulse Vst1, and the fourth TFT T4 of the second reset circuit 337 may be turned on. Therefore, the first node Q may be precharged with the first driving voltage of the first driving power Vdd1 supplied through the first TFT T1 turned on by the first gate start pulse Vst1, and the voltage of the second node QB may be discharged to the second driving power Vss1 supplied through the fourth TFT T4 turned on by the first gate start pulse Vst1. Accordingly, the pull-up TFT Tu of the scan output part 310 may be turned on by the first driving voltage charged into the first node Q and may supply a low voltage level VL of the first gate shift clock GCLK1, supplied to a first shift clock line, to the first gate line through the output node No. At this time, the pull-down TFT Td of the scan output part 310 may be turned off by the voltage of the second node QB which is discharged to the second driving power Vss1 through the fourth TFT T4.

Subsequently, when the first gate shift clock GCLK1 having a high voltage level VH is supplied to the first shift clock line, the first gate shift clock GCLK1 having a high voltage level VH may be supplied to the pull-up TFT Tu of the scan output part 310, and thus, the first node Q precharged with the first driving voltage of the first driving power Vdd1 may be bootstrapped to increase to a higher voltage, whereby the pull-up TFT Tu of the scan output part 310 may be completely turned on. Therefore, the first gate shift clock GCLK1 having a high voltage level VH may be supplied as the first scan pulse Vout1 to the first gate line through the completely turned-on pull-up TFT Tu of the scan output part 310 without a voltage being lost. At this time, the voltage of the second node QB may be discharged to the second driving power Vss1 through each of TFT T53 and TFT T54, turned on by the voltage of the first node Q, of the charging/discharging circuit 338, and thus, the pull-down TFT Td of the scan output part 310 may maintain a turn-off state.

Subsequently, an output signal Vout5 having a high voltage level VH is supplied from the fifth driving stage, the second TFT T2 of the first reset circuit 333 may be turned on by the output signal Vout5 of the fifth driving stage, and thus, the voltage of the first node Q may be discharged to the second driving power Vss1 through the second TFT T2, whereby the pull-up TFT Tu may be turned off. Simultaneously, in the charging/discharging circuit 338, each of TFT T53 and TFT T54 may be turned off by the voltage of the first node Q, and thus, the first driving voltage Vdd1 may be supplied to the internal node Ni through TFT T51, TFT T52 may be turned on by the first driving voltage of the first driving power Vdd1 supplied to the internal node Ni, and the first driving voltage of the first driving power Vdd1 may be supplied to the second node QB through TFT T52 to turn on the pull-down TFT Td. Therefore, the voltage of the output node No may be discharged to the second driving power Vss1 by the turned-on pull-down TFT Td, and thus, the gate-off voltage may be supplied to the first gate line.

A configuration and an operation of each of the driving stages other than the first driving stage among the driving stages configuring each of the n driving stage groups DSG1 to DSGn are the same as the above-described first driving stage DST1, and thus, their descriptions are omitted.

Figure 9:
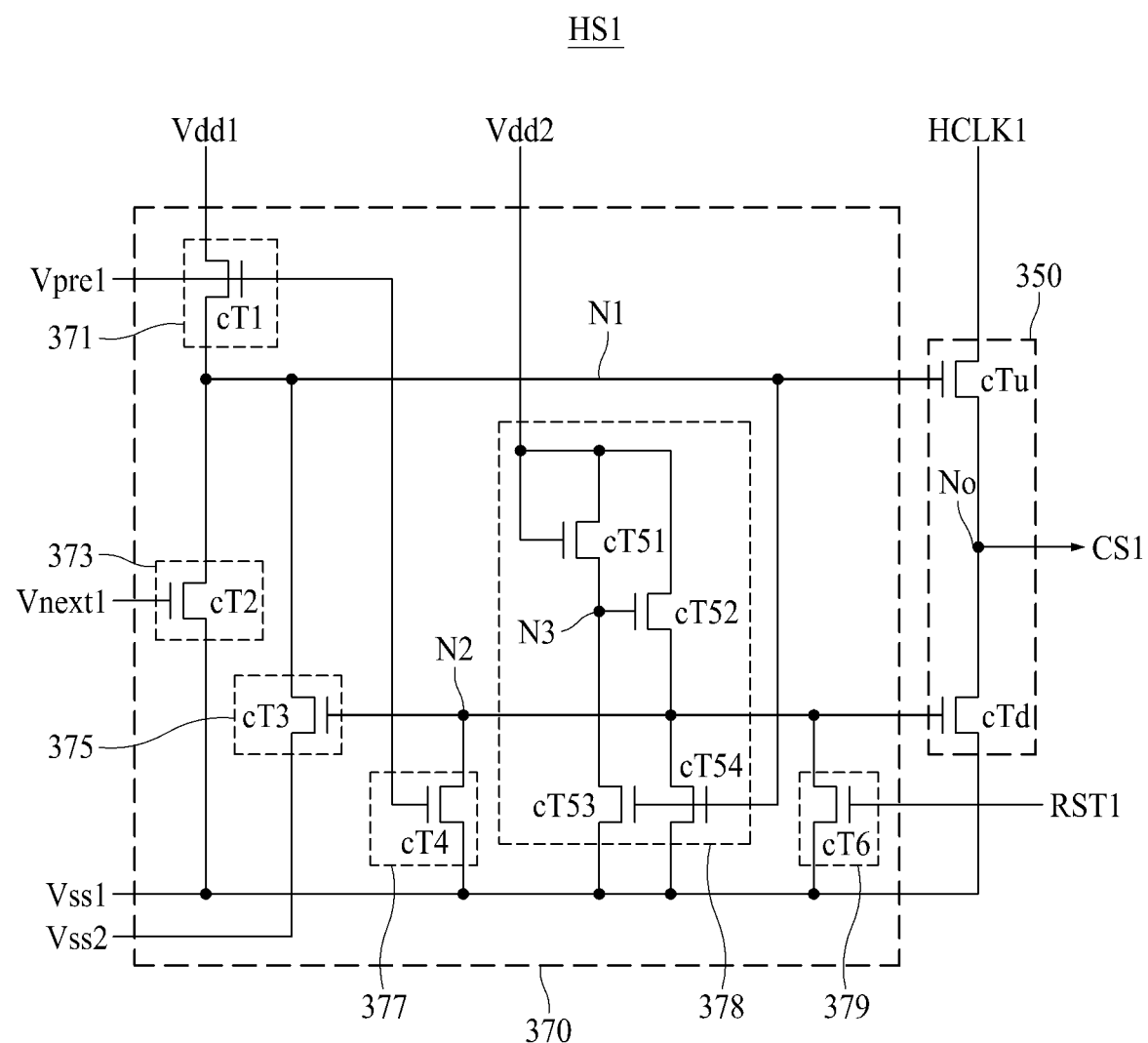
FIG. 9 is a diagram for describing an internal configuration of a first holding stage illustrated in FIG. 7.
Figure 10:
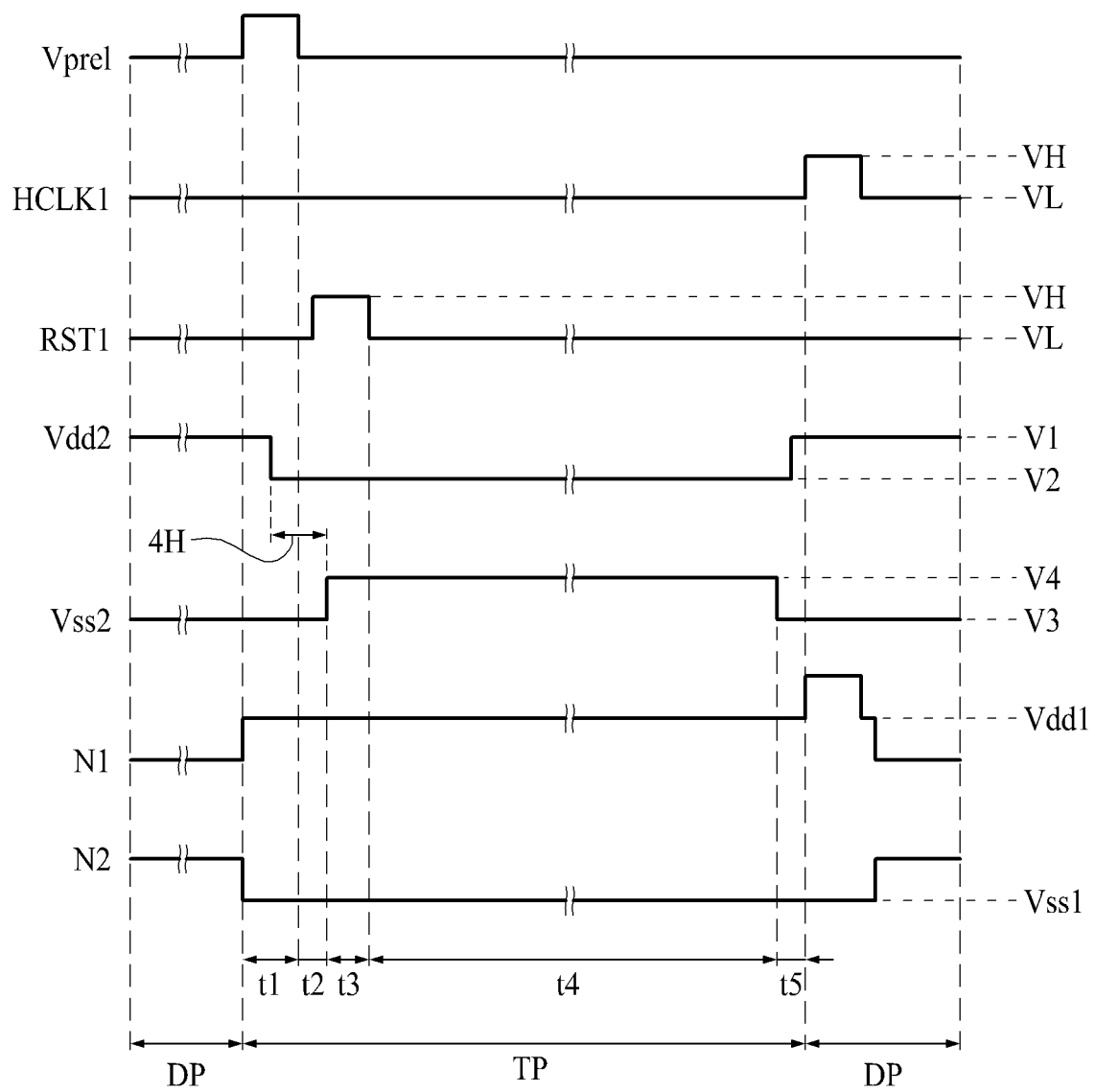
FIG. 10 is a driving waveform diagram of the first holding stage according to an embodiment illustrated in FIG. 9.

FIG. 9 is a diagram for describing an internal configuration of the first holding stage HS1 illustrated in FIG. 7, and FIG. 10 is a driving waveform diagram of the first holding stage according to an embodiment illustrated in FIG. 9.

Referring to FIGS. 7, 9, and 10, the first holding stage HS1 according to the present embodiment may include a carry output part 350 and a carry node controller 370.

The carry output part 350 may output a first carry pulse CS1, based on a voltage of each of a first control node N1 and a second control node N2. The carry output part 350 according to an embodiment may include a first output transistor cTu and a second output transistor cTd.

The first output transistor cTu may include a gate terminal connected to the first control node N1, a first terminal receiving the first scan holding clock HCLK1, and a second terminal connected to an output node No. The first output transistor cTu may be turned on based on the voltage of the first control node N1 and may output a high voltage level VH of the first scan holding clock HCLK1 as the first carry signal CS1. The first carry signal CS1 may be supplied as a gate start signal to a first driving stage of the second driving stage group DSG2.

The second output transistor cTd may include a gate terminal connected to the second control node N2, a first terminal receiving the second driving power Vss1, and a second terminal connected to the output node No. The second output transistor cTd may be turned on based on the voltage of the second control node N2 and may supply the second driving power Vss1 as a gate-off voltage to the first driving stage of the second driving stage group DSG2 through the output node No. That is, the second output transistor cTd may be turned on based on the voltage of the second control node N2 and may discharge a voltage of the output node No to the second driving power Vss1.

The carry node controller 370 may control the voltage of each of the first control node N1 and the second control node N2, based on an output signal (hereinafter referred to as a first holding start signal) Vpre1 of a previous fourth driving stage, an output signal (hereinafter referred to as a first holding reset signal) Vnext1 of the first driving stage of the second driving stage group DSG2, the first driving voltage Vdd1, the second driving power Vss1, the first node control power Vdd2, the second node control power Vss2, and the first stage reset clock RST1.

The carry node controller 370 according to an embodiment may include a carry node set circuit 371, a carry first reset circuit 373, a carry noise removal circuit 375, a carry second reset circuit 377, a carry charging/discharging circuit 378, and a carry third reset circuit 379. In such a configuration of the first holding stage HS1, the carry node set circuit 371 and the carry first reset circuit 373 may be defined as a first driver, the carry noise removal circuit 375 may be defined as a second driver, the carry second reset circuit 377 may be defined as a third driver, the carry charging/discharging circuit 378 may be defined as a fourth driver, and the carry third reset circuit 379 may be defined as a fifth driver.

The carry node set circuit 371 may control the voltage of the first control node N1 in response to the first holding start signal Vpre1. The carry node set circuit 371 according to an embodiment may include a first transistor cT1. The first transistor cT1 may include a gate terminal receiving the first holding start signal Vpre1 supplied from a front driving stage group, a first terminal connected to the first driving power Vdd1, and a second terminal connected to the first control node N1. The first transistor cT1 may be turned on by the first holding start signal Vpre1 and may charge the first driving voltage of the first driving power Vdd1 into the first control node N1.

The carry first reset circuit 373 may control the voltage of the first control node N1 in response to the first holding reset signal Vnext1. The carry first reset circuit 373 according to an embodiment may include a second transistor cT2. The second transistor cT2 may include a gate terminal receiving the first holding reset signal Vnext1 supplied from a rear driving stage group, a first terminal connected to the second driving power Vss1, and a second terminal connected to the first control node N1. The second transistor cT2 may be turned on by the first holding reset signal Vnext1 and may discharge the voltage of the first control node N1 to the second driving power Vss1.

The carry noise removal circuit 375 may control the voltage of the first control node N1 in response to the voltage of the second control node N2. That is, the carry noise removal circuit 375 may supply a second node control voltage of the second node control power Vss2 to the first control node N1 in response to the voltage of the second control node N2. Particularly, the carry noise removal circuit 375 according to the present disclosure may maintain a complete turn-off state in the touch sensing period, based on the second node control power Vss2 having an AC voltage, thereby stably holding the voltage of the first control node N1.

The carry noise removal circuit 375 according to an embodiment may include a third transistor cT3. The third transistor cT3 may include a gate terminal connected to the second control node N2, a first terminal connected to the second node control power Vss2, and a second terminal connected to the first control node N1. The third transistor cT3 may be turned on by the voltage of the second control node N2 and may electrically connect the first control node N1 to the second node control power Vss2. The third transistor cT3 may discharge the voltage of the first control node N1 to the second node control power Vss2 having the third voltage level V3 during a period (the display period) where the first output transistor cTu of the carry output part 350 maintains a turn-off state, and thus, may remove noise, which occurs in the first control node N1 due to coupling between a gate electrode and a source electrode of the first output transistor cTu, at every rising period of the first scan holding clock HCLK1 supplied to the first output transistor cTu.

Moreover, the third transistor cT3 may maintain a complete turn-off state with a gate-source voltage based on the second node control power Vss2 having the fourth voltage level V4 and the voltage of the second control node N2 during a period (the touch sensing period) where the first output transistor cTu of the carry output part 350 maintains a turn-on state, thereby stably holding the voltage of the first control node N1. That is, despite having a threshold voltage shifted in a negative (−) direction, the third transistor cT3 may be completely turned off by the gate-source voltage based on the second node control power Vss2 having the fourth voltage level V4 and the voltage of the second control node N2 during the touch sensing period, thereby stably holding the voltage of the first control node N1 during the touch sensing period. For example, during the touch sensing period, the third transistor cT3 may have a gate-source voltage Vgs of −30V, based on the voltage "−10V" of the second control node N2 and a voltage "20V" of the second node control power Vss2, and thus, may be completely turned off. Accordingly, in the present disclosure, the voltage of the first control node N1 may be stably held during the touch sensing period, thereby increasing the voltage reliability of the first carry signal CS1.

The carry second reset circuit 377 may control the voltage of the second control node N2 in response to the first holding start signal Vpre1. The carry second reset circuit 377 according to an embodiment may include a fourth transistor cT4. The fourth transistor cT4 may include a gate terminal receiving the first holding start signal Vpre1 supplied from a front driving stage group, a first terminal connected to the second driving power Vss1, and a second terminal connected to the second control node N2. The fourth transistor cT4 may be turned on by the first holding start signal Vpre1 and may discharge the voltage of the second control node N2 to the second driving power Vss1.

The carry charging/discharging circuit 378 may control the voltage of the second control node N2 in response to the voltage of the first control node N1. That is, the carry charging/discharging circuit 378 may charge the first node control voltage of the first node control power Vdd2 into the second control node N2 in response to the voltage of the first control node N1, or may discharge the voltage of the second control node N2 to the second driving power Vss1. The carry charging/discharging circuit 378 according to an embodiment may include transistors cT51 to cT54. The carry charging/discharging circuit 378 may be referred as an inverter circuit which controls the voltage of the second control node N2 to a voltage opposite to the voltage of the first control node N1.

Transistor cT51 may include a gate terminal and a first terminal connected to the first node control power Vdd2 and a second terminal connected to an intermediate node N3. Transistor cT51 may be turned on by the first node control power Vdd2 and may supply the first node control voltage of the first node control power Vdd2 to the intermediate node N3.

Transistor cT52 may include a gate terminal connected to the intermediate node N3, a first terminal connected to the first node control power Vdd2, and a second terminal connected to the second control node N2. Transistor cT52 may be turned on/off based on a voltage of the intermediate node N3, and when transistor cT52 is turned on, transistor cT52 may supply the first node control voltage of the first node control power Vdd2 to the second control node N2.

Transistor cT53 may include a gate terminal connected to the first control node N1, a first terminal connected to the second driving power Vss1, and a second terminal connected to the intermediate node N3. Transistor cT53 may be turned on/off based on the voltage of the first control node N1, and when transistor cT53 is turned on, transistor cT53 may discharge the voltage of the intermediate node N3 to the second driving power Vss1.

Transistor cT54 may include a gate terminal connected to the first control node N1, a first terminal connected to the second driving power Vss1, and a second terminal connected to the second control node N2. Transistor cT54 may be turned on/off based on the voltage of the first control node N1, and when transistor cT54 is turned on, transistor cT54 may discharge the voltage of the second control node N2 to the second driving power Vss1.

During the display period, when each of transistor cT53 and transistor cT54 is turned off based on the voltage of the first control node N1, the carry charging/discharging circuit 378 may charge the first node control voltage of the first node control power Vdd2 into the intermediate node N3 through transistor cT51 turned on by the first node control voltage of the first node control power Vdd2 and may charge the first node control voltage of the first node control power Vdd2 into the second control node N2 through transistor cT52 turned on by the voltage of the intermediate node N3.

During the touch sensing period, when each of transistor cT53 and transistor cT54 is turned on based on the voltage of the first control node N1, the carry charging/discharging circuit 378 may discharge the voltage of the intermediate node N3 to the second driving power Vss1 through the turned-on transistor cT53 to turn off transistor cT52, and simultaneously, may discharge the voltage of the second control node N2 to the second driving power Vss1 through the turned-on transistor cT54. In the carry charging/discharging circuit 378, each of transistor cT51 and transistor cT52 may maintain a turn-off state with the first node control voltage having the second voltage level of the first node control power Vdd2 during the touch sensing period where the voltage of the second control node N2 is maintained as the gate-off voltage according to the turn-on of each of transistor cT53 and transistor cT54. Accordingly, in the present disclosure, the undesired turn-on of each of transistor cT51 and transistor cT52 is prevented during the touch sensing period, thereby reducing the deterioration of each of transistor cT51 and transistor cT52.

Transistor cT53 may have a channel size which is relatively larger than that of transistor cT51, for discharging the voltage of the first node control power Vdd2 applied to the intermediate node N3 through transistor cT51 turned on by the first node control power Vdd2.

The carry third reset circuit 379 may control the voltage of the second control node N2 in response to the first stage reset clock RST1. The carry third reset circuit 379 according to an embodiment may include a sixth transistor cT6. The sixth transistor cT6 may include a gate terminal receiving the first stage reset clock RST1, a first terminal connected to the second driving power Vss1, and a second terminal connected to the second control node N2. The sixth transistor cT6 may be turned on by the first stage reset clock RST1 and may discharge the voltage of the second control node N2 to the second driving power Vss1. Particularly, the sixth transistor cT6 may be turned on by the first stage reset clock RST1 and may maintain a turn-on state from before a period where the second node control power Vss2 rises from the third voltage level to the fourth voltage level, thereby preventing ripple from occurring in the voltage of the second control node N2 due to the rising of the second node control power Vss2. In another holding stage group, despite ripple occurring in the voltage of the second control node N2 when the second node control power Vss2 is rising, the fourth voltage level of the second node control power Vss2 may be stably supplied to the first control node N1. A rising time of the second node control power Vss2 may be delayed by at least one horizontal period from a rising time of the first stage reset clock RST1.

Each of the transistors configuring the first holding stage HS1 according to the present embodiment may be formed of a TFT including an oxide semiconductor layer such as ZnO, InZnO, or InGaZnO.

Hereinafter, an operation of the first holding stage HS1 according to the present embodiment will be described with reference to FIGS. 9 and 10.

The first holding stage HS1 according to the present embodiment may be driven in the display period and the touch sensing period.

First, during a display period DP, the first holding stage HS1 may supply the second driving power Vss1 as the gate-off voltage to a first driving stage of the second driving stage group DSG2 through an output node No. That is, in the first holding stage HS1, the second control node N2 may be connected to the first node control power Vdd2 having the first voltage level V1 through the carry charging/discharging circuit 378, and the first control node N1 may be connected to the second node control power Vss2 having the third voltage level V3 through the third transistor cT3 turned on by the voltage of the second control node N2. Therefore, during the display period DP, a first output transistor cTu may maintain a turn-off state, based on the voltage of the first control node N1 maintained as the second node control voltage having the third voltage level of the second node control power Vss2, and a second output transistor cTd may maintain a turn-on state, based on the voltage of the second control node N2 maintained as the first node control voltage having the first voltage level of the first node control power Vdd2. Therefore, during the display period DP, the first holding stage HS1 may supply the gate-off voltage, supplied through the turned-on second output transistor cTd from the second driving power Vss1, to the first driving stage of the second driving stage group DSG2.

Subsequently, during a touch sensing period TP, the first holding stage HS1 may hold the voltage of the first control node N1 for a certain time in response to the first holding start signal Vpre1 supplied from a previous fourth driving stage, and then, may supply the first scan holding clock HCLK1 as the first carry signal CS1 to the first driving stage of the second driving stage group DSG2 through the output node No. During the touch sensing period TP, the first holding stage HS1 may hold the voltage of the first control node N1 for a certain time in first to fifth holding periods t1 to t5, and then, may output the first scan holding clock HCLK1 as the first carry signal CS1 immediately after the touch sensing period TP ends or at a start time of the display period DP.

First, in the first holding period t1, when the first holding start signal Vpre1 is supplied from the previous fourth driving stage, each of the first transistor cT1 and the fourth transistor cT4 may be turned on by the first holding start signal Vpre1, and thus, the first control node N1 may be precharged with the first driving voltage of the first driving power Vdd1 supplied through the first transistor cT1 turned on by the first holding start signal Vpre1, and the voltage of the second control node N2 may be discharged to the second driving power Vss1 supplied through the fourth transistor cT4 turned on by the first holding start signal Vpre1. Accordingly, the first output transistor cTu of the carry output part 350 may be turned on by the first driving voltage of the first driving power Vdd1 charged into the first control node N1 and may supply a low voltage level VL of the first scan holding clock HCLK1, supplied to a first scan holding clock line, to the first driving stage of the second driving stage group DSG2 through the output node No, and the first driving stage of the second driving stage group DSG2 may not be enabled by the low voltage level VL of the first scan holding clock HCLK1. At this time, the second output transistor cTd of the carry output part 350 may be turned off by the voltage of the second control node N2 which is discharged to the second driving power Vss2 through the fourth transistor cT4.

In the first holding period t1, the first node control power Vdd2 may fall from the first voltage level V1 to the second voltage level V2, and thus, each of transistor cT51 and transistor cT52 of the carry charging/discharging circuit 378 may be turned off. Therefore, during the touch sensing period TP, the undesired turn-on of each of transistor cT51 and transistor cT52 is prevented during the touch sensing period TP, thereby minimizing the deterioration of each of transistor cT51 and transistor cT52.

In the first holding period t1, the second node control power Vss2 may be maintained at the third voltage level V3. For example, the second node control power Vss2 may rise from the third voltage level V3 to the fourth voltage level V4 simultaneously with the falling of the first node control power Vdd2. In this case, however, the third transistor cT3 may be turned on, and thus, the second node control power Vss2 having the fourth voltage level V4 may be supplied to the first control node N1. At this time, in the first holding period t1, the second node control power Vss2 may be maintained at the third voltage level V3, and thus, the turn-on of the third transistor cT3 is prevented when the first node control power Vdd2 falls.

Subsequently, in the second holding period t2, when the first stage reset clock RST1 having a high voltage level VH is supplied, the sixth transistor cT6 may be turned on by the first stage reset clock RST1 having a high voltage level VH, and thus, the voltage of the second control node N2 may be discharged to the second driving power Vss1 through the sixth transistor cT6. In the second holding period t2, the second node control power Vss2 may be maintained at the third voltage level V3. Accordingly, the voltage of the first control node N1 may be maintained at a voltage level which is precharged in the first holding period t1, and thus, may be stabilized.

Subsequently, in the third holding period t3, at least four horizontal periods may elapse after a falling time of the first node control power Vdd2, and thus, the second driving voltage of the second node control power Vss2 may rise from the third voltage level V3 to the fourth voltage level V4. Therefore, the third transistor cT3 may be completely turned off by a gate-source voltage Vgs based on the second node control power Vss2 having the fourth voltage level V4 and the voltage of the second control node N2, and thus, the voltage of the first control node N1 may be maintained at the voltage level which is precharged in the first holding period t1. Also, the voltage of the second node control power Vss2 may be maintained at the voltage level of the second driving power Vss1. At this time, a rising time of the second node control power Vss2 may be delayed by at least four horizontal periods from a rising time of the first node control power Vdd2, and thus, the turn-on of the third transistor cT3 is prevented when the first node control power Vdd2 falls. For example, the rising time of the second node control power Vss2 may be delayed by at least four horizontal periods from the rising time of the first node control power Vdd2 in order for the first and second holding periods t1 and t2 to be performed in each of the second to fourth holding stages other than the first holding stage among the holding stages included in the first holding stage group.

Subsequently, in the fourth holding period t4, when the first stage reset clock RST1 having a low voltage level VL is supplied, the sixth transistor cT6 may be turned off by the first stage reset clock RST1 having a low voltage level VL. Therefore, transistor cT54 of the carry charging/discharging circuit 378 which is in a turn-on state according to the voltage of the first control node N1 may be connected to the second driving power Vss1, and thus, the voltage of the second control node N2 may be maintained at a voltage level of the second driving power Vss1. The fourth holding period t4 may be maintained for a relatively longer time than the first to third holding periods t1 to t3 in the touch sensing period TP.

Subsequently, in the fifth holding period t5, the second driving voltage of the second node control power Vss2 may fall from the fourth voltage level V4 to the third voltage level V3, and then, the first driving voltage of the first node control power Vdd2 may rise from the second voltage level V2 to the first voltage level V1. The fifth holding period t5 may be for preventing ripple from occurring in the voltage of the first control node N1 of each of first holding stages (or first holding stages having a non-driving state) included in another holding stage group due to rising of the first scan holding clock HCLK1. That is, the first node control power Vdd2 may rise from the second voltage level V2 to the first voltage level V1 before rising of the first scan holding clock HCLK1, and thus, the voltage of the second control node N2 of a first holding stage included in another holding stage group may increase to turn on the third transistor cT3, thereby preventing ripple from occurring in the voltage of the first control node N1 due to rising of the first scan holding clock HCLK1.

Subsequently, when the first scan holding clock HCLK1 having a high voltage level VH is supplied immediately after the touch sensing period TP ends or a start time of a next display period DP, the voltage of the first control node N1 maintained at a voltage level precharged by the first driving power Vdd1 may be bootstrapped according to the first scan holding clock HCLK1 having a high voltage level VH being supplied to the first output transistor cTu of the carry output part 350, and thus, may increase to a higher voltage, whereby the first output transistor cTu may be completely turned on. Therefore, the first scan holding clock HCLK1 having a high voltage level VH may be supplied as the first carry signal CS1 to the first driving stage of the second driving stage group DSG2 through the completely turned-on first output transistor cTu of the carry output part 350 without a voltage being lost. At this time, in comparison with the voltage level precharged by the first driving power Vdd1, a relatively low bias stress is applied to the first output transistor cTu during the first to fifth holding periods t1 to t5 of the touch sensing period TP, and a relatively high bias stress is applied to the first output transistor cTu during only a relatively short bootstrapping period. Accordingly, according to the present disclosure, deterioration of the first output transistor cTu is minimized.

A configuration and an operation of each of the holding stages other than the first holding stage among the holding stages configuring each of the k holding stage groups HSG1 to HSGk are the same as the above-described first holding stage HS1, and thus, their descriptions are omitted.

As described above, in the display apparatus according to an embodiment of the present disclosure, each of the first and second node control powers Vdd2 and Vss2 supplied to a plurality of holding stages which operate in each of a plurality of touch sensing periods in one frame may be supplied as an AC voltage (or an AC form), and thus, a voltage of the precharged first control node N1 of each of the holding stages may be stably held for a long time in the touch sensing period, thereby reducing deterioration of the first output transistor cTu.

Figure 11:
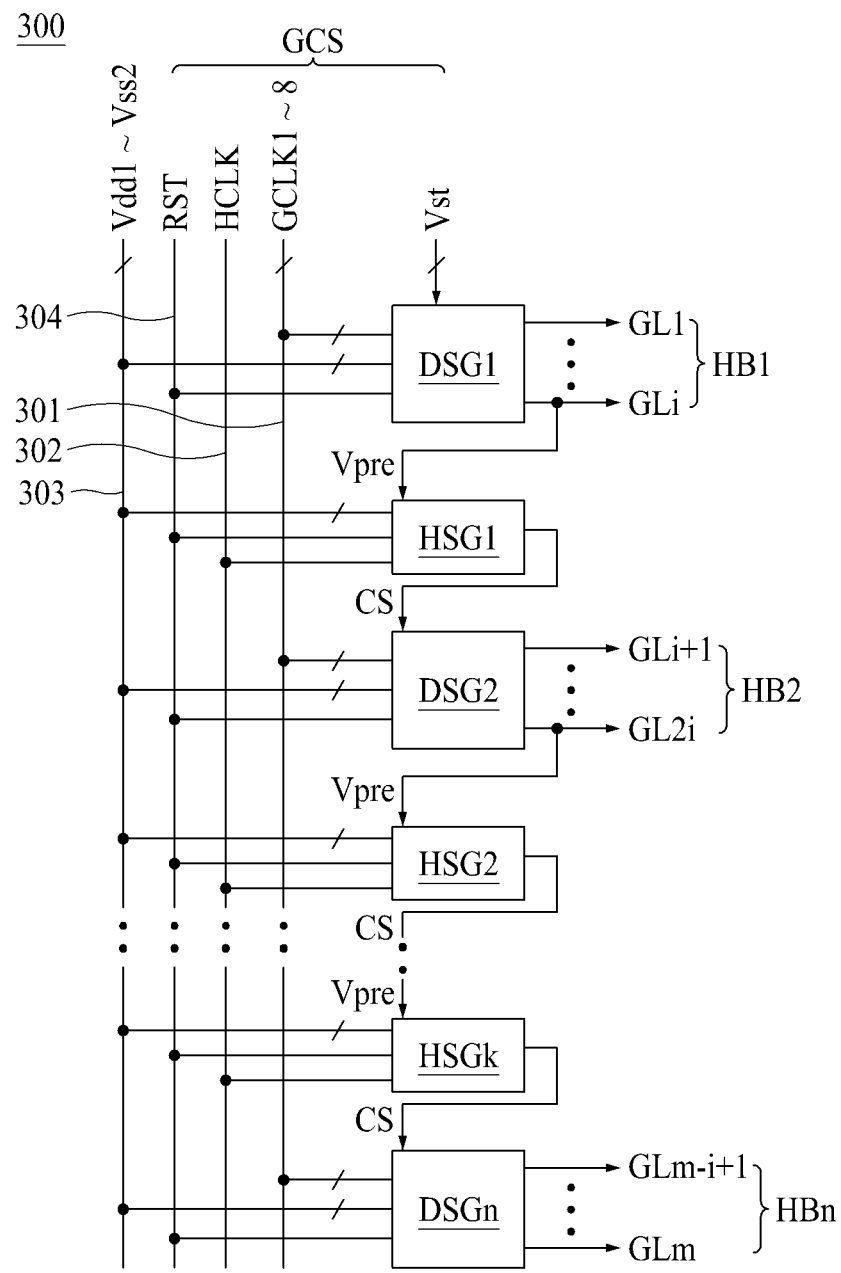
FIG. 11 is a diagram for describing a gate driving circuit according to another embodiment of the present disclosure.

FIG. 11 is a diagram for describing a gate driving circuit 300 according to another embodiment of the present disclosure and is configured by modifying a configuration of a holding stage group and a gate control signal.

Referring to FIG. 11, the gate driving circuit 300 according to another embodiment of the present disclosure may include n number of driving stage groups DSG1 to DSGn, k number of holding stage groups HSG1 to HSGk, a shift clock line part 301, a scan holding clock line part 302, a power line part 303, and a reset clock line part 304.

Each of the n driving stage groups DSG1 to DSGn may sequentially supply a scan pulse to i number of gate lines GL included in a corresponding horizontal block of horizontal blocks HB1 to HBn during a first period of a time division driving signal. Each of the n driving stage groups DSG1 to DSGn according to an embodiment may include i number of driving stages. In this case, the gate driving circuit 300 may include a number of driving stages corresponding to the total number of gate lines.

Each of the i driving stages may include an output node connected to each of the i gate lines GL. For example, first to $i^{th}$ driving stages of a first driving stage group DSG1 may be respectively connected to first to $i^{th}$ gate lines GL1 to GLi.

The first driving stage of the i driving stages may be enabled in response to a gate start signal Vst supplied from the timing control circuit and may be reset in response to an output signal of the second driving stage. Each of the second to driving stages may be enabled in response to an output signal of a front driving stage and may be reset in response to an output signal of a rear driving stage. Also, the $i^{th}$ driving stage may be enabled in response to an output signal of the $i-1^{th}$ driving stage and may be reset in response to a stage reset clock supplied from the reset clock line part 304.

Except for that one gate start signal Vst and one stage reset clock RST are supplied from the timing control circuit, each of the i driving stages includes the same elements as those of the first driving stage illustrated in FIG. 8, and thus, its overlapping description is omitted.

Each of the k holding stage groups HSG1 to HSGk may be disposed between the n driving stage groups DSG1 to DSGn, and during a second period of the time division driving signal, each of the k holding stage groups HSG1 to HSGk may supply one carry signal CS to a first driving stage of a rear driving stage group according to a voltage of a first control node and a voltage of a second control node, which are based on a first node control power Vdd2, a second node control power Vss2, and an output signals Vpre supplied from a last driving stage of front driving stage groups DSG1 to DSGn-1, and the one carry signal CS may be applied as the gate start signal Vst to the first driving stage of the rear driving stage group. Except for outputting one carry signal CS, each of the k holding stage groups HSG1 to HSGk is the same as the k holding stage groups illustrated in FIG. 4.

Each of the k holding stage groups HSG1 to HSGk according to an embodiment may include one holding stage.

Each of the holding stages may receive, as the holding start signal Vpre, an output signal of a last driving stage of a front driving stage group and may be enabled according to received output signal to supply a scan holding clock HCLK as the carry signal CS to a first driving stage of a corresponding driving stage group of the second to $n^{th}$ driving stage groups DSG2 to DSGn. Also, each of the holding stages may be reset by a stage reset clock RST. Each of the holding stages includes the same elements as those of the first holding stage HS1 illustrated in FIGS. 9 and 10, and thus, descriptions of its configuration and operation are omitted.

The shift clock line part 301 may include first to eighth shift clock lines which are supplied with first to eighth gate shift clocks GCLK1 to GCLK8 having a sequentially shifted phase from the timing control circuit. In this case, a $j^{th}$ (where j is a natural number from one to eight) shift clock line may be connected to an $8a\text{-}b^{th}$ (where a is a natural number, and b is a natural number equal to "8-j") driving stage DST8a-b. Therefore, a $j^{th}$ gate shift clock may be supplied to the $8a\text{-}b^{th}$ driving stage DST8a-b through the $j^{th}$ shift clock line.

Each of the first to eighth gate shift clocks GCLK1 to GCLK8 may include a first voltage period and a second voltage period which are repeated at one horizontal period. Here, the first voltage period may have a high voltage level VH for turning on a transistor, and the second voltage period may have a low voltage level VL for turning off a transistor. The first voltage period of each of the first to eighth gate shift clocks GCLK1 to GCLK8 may be shifted by one horizontal period, and thus, may not overlap a first voltage period of an adjacent gate shift clock.

The scan holding clock line part 302 may include one scan holding clock line which is supplied with the scan holding clock HCLK from the timing control circuit. The one scan holding clock line may be connected to a holding stage of each of the k holding stage groups HSG1 to HSGk.

The scan holding clock HCLK may rise from a low voltage level VL to a high voltage level VH immediately after the second period of the time division driving signal ends or at a start time of the first period of the time division driving signal, and after a predetermined period, may fall from the high voltage level VH to the low voltage level VL. In this case, the scan holding clock HCLK may be generated once immediately after each of a plurality of second periods included in the time division driving signal ends or at a start time of each of a plurality of first periods included in the time division driving signal, in one frame period. For example, when the scan holding clock HCLK is generated in the touch sensing period, the scan pulse may be output from the second to $n^{th}$ driving stage groups DSG2 to DSGn, and before the touch sensing period ends, the touch sensing period may be changed to the display period. For this reason, the touch sensing period is reduced, and due to this, touch sensing performed on a horizontal block may not be completed.

The power line part 303 may include first to fourth power lines which are supplied with a first driving power Vdd1, a second driving power Vss1, the first node control power Vdd2, and the second node control power Vss2 from the power generation circuit. The power line part 303 is the same as the power line part illustrated in FIG. 4, and thus, its overlapping description is omitted.

The reset clock line part 304 may include a reset clock line which is supplied with the stage reset clock RST from the timing control circuit. The reset clock line may be connected to a last driving stage of each of the n driving stage groups DSG1 to DSGn and may be connected to a holding stage of each of the k holding stage groups HSG1 to HSGk.

The stage reset clock RST may have a high voltage level VH and a low voltage level VL. In this case, the high voltage level VH of the stage reset clock RST may have a pulse width which is equal to or wider than that of the gate start signal Vst having one horizontal period. The stage reset clock RST may rise from the low voltage level VL to the high voltage level VH before the second node control power Vss2 rises from the third voltage level to the fourth voltage level, in the second period of the time division driving signal. That is, a rising time of the stage reset clock RST may be set to a time between a falling time of the first node control power Vdd2 and a rising time of the second node control power Vss2.

Except for that each of the first to $n^{th}$ driving stage groups DSG1 to DSGn is enabled by the gate start signal Vst or a carry signal output from a holding stage of each of front holding stage groups and each of the first to $k^{th}$ holding stage groups HSG1 to HSGk is enabled by an output signal of a last driving stage of each of front driving stage groups DSG2 to DSGn, the gate driving circuit 300 according to another embodiment of the present disclosure is the same as the gate driving circuit illustrated in FIGS. 1 to 10, and thus, its overlapping description is omitted.

As described above, in a display apparatus including the gate driving circuit 300 according to another embodiment of the present disclosure, each of the first and second node control powers Vdd2 and Vss2 supplied to a plurality of holding stages which operate in each of a plurality of touch sensing periods in one frame may be supplied as an AC voltage (or an AC form), and thus, a voltage of the precharged first control node N1 of each of the holding stages may be stably held for a long time in the touch sensing period, thereby reducing deterioration of the first output transistor cTu.

Figure 12:
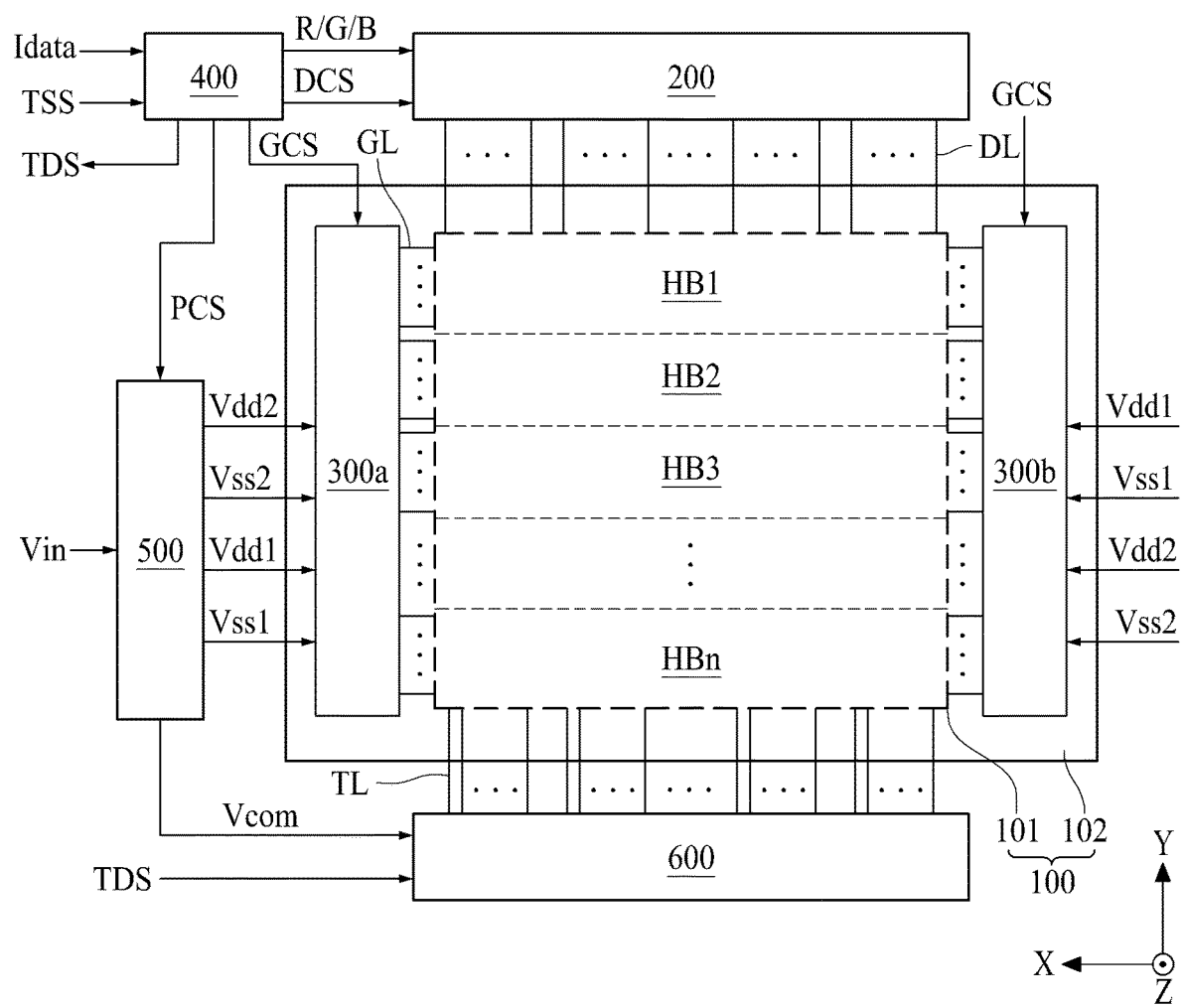
FIG. 12 is a diagram for describing a display apparatus according to another embodiment of the present disclosure.
Figure 13:
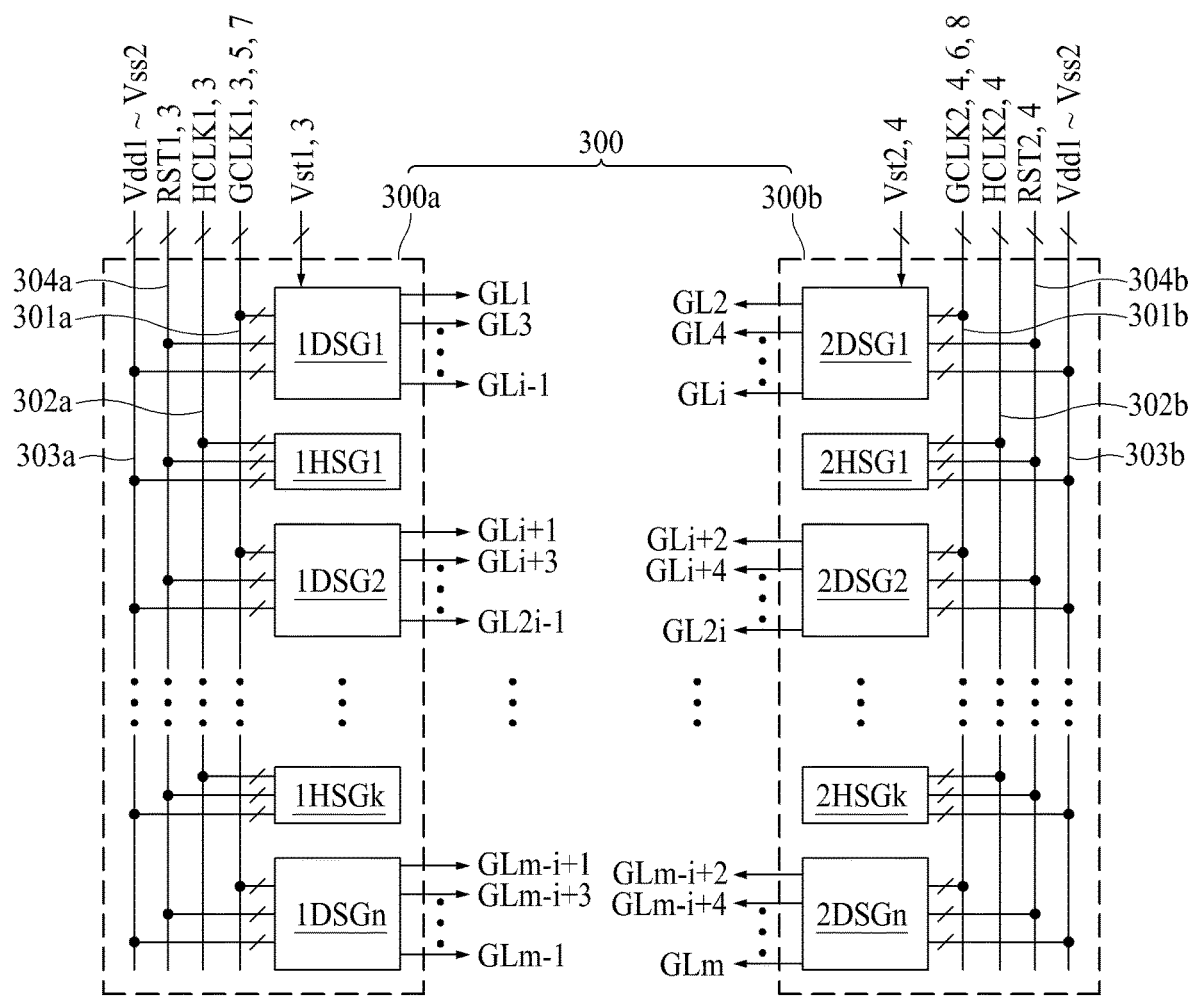
FIG. 13 is a diagram for describing a gate driving circuit illustrated in FIG. 12.

FIG. 12 is a diagram for describing a display apparatus according to another embodiment of the present disclosure, and FIG. 13 is a diagram for describing a gate driving circuit illustrated in FIG. 12. The display apparatus according to another embodiment of the present disclosure may be implemented by modifying the gate driving circuit of the display apparatus illustrated in FIG. 1. Hereinafter, therefore, only a gate driving circuit and elements relevant thereto will be described, and overlapping descriptions of the other elements are omitted.

Referring to FIGS. 12 and 13, a gate driving circuit 300 according to the present embodiment may drive a plurality of gate lines GL, based on a single feeding-based interlacing manner. The gate driving circuit 300 according to an embodiment may include a first shift register 300a and a second shift register 300b.

The first shift register 300a may be embedded (or integrated) into one non-display area (or a left non-display area) of the display panel 100 and may be connected to each of odd-numbered gate lines of a plurality of gate lines GL. The first shift register 300a may sequentially supply a scan pulse to odd-numbered gate lines of i gate lines included in a horizontal block group by units of horizontal blocks at every first period of a time division driving signal TDS, based on a gate control signal GCS supplied from a timing control circuit.

The first shift register 300a according to an embodiment may include n number of odd driving stage groups 1DSG1 to 1DSGn, k number of odd holding stage groups 1HSG1 to 1HSGk, an odd shift clock line part 301a, an odd scan holding clock line part 302a, an odd power line part 303a, and an odd reset clock line part 304a.

Each of the n odd driving stage groups 1DSG1 to 1DSGn may sequentially supply a scan pulse to odd-numbered gate lines of i gate lines GL included in corresponding horizontal blocks HB1 to HBn during a first period of a time division driving signal. Each of the n odd driving stage groups 1DSG1 to 1DSGn may include i/2 number of driving stages. That is, each of the n odd driving stage groups 1DSG1 to 1DSGn may include odd-numbered driving stages DST1, DST3, ..., and DSTi-1 included in the driving stage group illustrated in FIG. 5. Therefore, the first shift register 300a may include a number of driving stages corresponding to half of the total number of gate lines.

Each of the driving stages included in each of the n odd driving stage groups 1DSG1 to 1DSGn may be configured identical to each of the odd-numbered driving stages DST1, DST3, ..., and DSTi-1 of the driving stage group illustrated in FIG. 5. Except for that each of the driving stages is enabled by each of first and third gate start signals Vst1 and Vst3 to sequentially supply the scan pulse to odd-numbered gate lines, each of the driving stages includes the same elements as those of the first driving stage illustrated in FIG. 8, and thus, descriptions of its configuration and operation are omitted.

Each of the k odd holding stage groups 1HSG1 to 1HSGk may be disposed between the n odd driving stage groups 1DSG1 to 1DSGn, and during a second period of the time division driving signal, each of the k odd holding stage groups 1HSG1 to 1HSGk may sequentially supply first and third carry signals to a rear odd driving stage group according to a voltage of a first control node and a voltage of a second control node, which are based on a first node control power Vdd2, a second node control power Vss2, and two output signals supplied from front odd driving stage groups 1DSG1 to 1DSGn-1. The first and third carry signals may be respectively applied as the first and third gate start signals Vst1 and Vst3 to first and second driving stages of the rear odd driving stage group.

Each of the k odd holding stage groups 1HSG1 to 1HSGk according to an embodiment may include first and second holding stages. That is, each of the k odd holding stage groups 1HSG1 to 1HSGk may be configured with the odd-numbered driving stages HS1 and HS3 of the holding stage group illustrated in FIG. 7.

Each of the first and second holding stages may be enabled by a corresponding output signal of two output signals respectively supplied from i-1$^{th}$ and i$^{th}$ driving stages of a front odd driving stage group and may supply, as the first and third carry signals, a corresponding scan holding clock of first and third scan holding clocks HCLK1 and HCLK3 to a corresponding driving stage of first and second driving stages of each of second to n$^{th}$ odd driving stage groups 1DSG2 to 1DSGn. Also, the first and second holding stages may be sequentially reset by a corresponding stage reset clock of first and third stage reset clocks RST1 and RST3.

Each of the holding stages included in each of the k odd holding stage groups 1HSG1 to 1HSGk may be configured identical to each of the odd-numbered holding stages HS1 and HS3 of the holding stage group illustrated in FIG. 7. Except for that the holding stages are enabled by two output signals respectively supplied from i-1$^{th}$ and i$^{th}$ driving stages of a front odd driving stage group to supply the first and third carry signals, each of the holding stages includes the same elements as those of the first holding stage HS1 illustrated in FIGS. 9 and 10, and thus, descriptions of its configuration and operation are omitted.

Except for that the odd shift clock line part 301a includes four shift clock lines which are supplied with odd-numbered gate shift clocks GCLK1, GCLK3, GCLK5, and GCLK7 of first to eighth gate shift clocks GCLK1 to GCLK8 having a sequentially shifted phase from the timing control circuit, the odd shift clock line part 301a is the same as the illustrations of FIGS. 4 to 6, and thus, its overlapping description is omitted.

Except for that the odd scan holding clock line part 302a includes two scan holding clock lines which are supplied with first and third scan holding clocks HCLK1 and HCLK3 of first to fourth scan holding clocks HCLK1 to HCLK4 having a sequentially shifted phase from the timing control circuit, the odd scan holding clock line part 302a is the same as the illustrations of FIGS. 4 to 7, and thus, its overlapping description is omitted.

The odd power line part 303a include first to fourth power lines which are supplied with a first driving power Vdd1, a second driving power Vss1, a first node control power Vdd2, and a second node control power Vss2 from the power generation circuit. The odd power line part 303a is the same as the illustrations of FIGS. 4 to 7, and thus, its overlapping description is omitted.

Except for that the odd reset clock line part 304a includes two reset clock lines which are supplied with first and third stage reset clocks RST1 and RST3 of first to fourth stage reset clocks RST1 to RST4 from the timing control circuit, the odd reset clock line part 304a is the same as the illustrations of FIGS. 4 to 7, and thus, its overlapping description is omitted.

The second shift register 300b may be embedded (or integrated) into the other non-display area (or a right non-display area) of the display panel 100 and may be connected to each of even-numbered gate lines of the plurality of gate lines GL. The second shift register 300b may sequentially supply the scan pulse to even-numbered gate lines of the i gate lines included in the horizontal block group by units of horizontal blocks at every first period of the time division driving signal TDS, based on the gate control signal GCS supplied from the timing control circuit.

The second shift register 300b according to an embodiment may include n number of even driving stage groups 2DSG1 to 2DSGn, k number of even holding stage groups 2HSG1 to 2HSGk, an even shift clock line part 301b, an even scan holding clock line part 302b, an even power line part 303b, and an even reset clock line part 304b.

Each of the n even driving stage groups 2DSG1 to 2DSGn may sequentially supply the scan pulse to even-numbered gate lines of the i gate lines GL included in the corresponding horizontal blocks HB1 to HBn during the first period of the time division driving signal. Each of the n even driving stage groups 2DSG1 to 2DSGn according to an embodiment may include i/2 number of driving stages. That is, each of then even driving stage groups 2DSG1 to 2DSGn may include even-numbered driving stages DST2, DST4, . . . , and DSTi included in the driving stage group illustrated in FIG. 5. Therefore, the second shift register 300b may include a number of driving stages corresponding to half of the total number of gate lines.

Each of the driving stages included in each of the n even driving stage groups 2DSG1 to 2DSGn may be configured identical to each of the even-numbered driving stages DST2, DST4, . . . , and DSTi of the driving stage group illustrated in FIG. 5. Except for that each of the driving stages is enabled by each of second and fourth gate start signals Vst2 and Vst4 to sequentially supply the scan pulse to even-numbered gate lines, each of the driving stages includes the same elements as those of the first driving stage illustrated in FIG. 8, and thus, descriptions of its configuration and operation are omitted.

Each of the k even holding stage groups 2HSG1 to 2HSGk may be disposed between the n even driving stage groups 2DSG1 to 2DSGn, and during the second period of the time division driving signal, each of the k even holding stage groups 2HSG1 to 2HSGk may sequentially supply second and fourth carry signals to a rear even driving stage group according to the voltage of the first control node and the voltage of the second control node, which are based on the first node control power Vdd2, the second node control power Vss2, and two output signals supplied from front even driving stage groups 2DSG1 to 2DSGn-1. The second and fourth carry signals may be respectively applied as the second and fourth gate start signals Vst2 and Vst4 to first and second driving stages of the rear even driving stage group.

Each of the k even holding stage groups 2HSG1 to 2HSGk according to an embodiment may include first and second holding stages. That is, each of the k even holding stage groups 2HSG1 to 2HSGk may be configured with the even-numbered driving stages HS2 and HS4 of the holding stage group illustrated in FIG. 7.

Each of the first and second holding stages may be enabled by a corresponding output signal of two output signals respectively supplied from i-1$^{th}$ and i$^{th}$ driving stages of a front even driving stage group and may supply, as the second and fourth carry signals, a corresponding scan holding clock of second and fourth scan holding clocks HCLK2 and HCLK4 to a corresponding driving stage of first and second driving stages of each of second to n$^{th}$ even driving stage groups 2DSG2 to 2DSGn. Also, the first and second holding stages may be sequentially reset by a corresponding stage reset clock of second and fourth stage reset clocks RST2 and RST4.

Each of the holding stages included in each of the k even holding stage groups 2HSG1 to 2HSGk may be configured identical to each of the even-numbered holding stages HS2 and HS4 of the holding stage group illustrated in FIG. 7. Except for that the holding stages are enabled by two output signals respectively supplied from i-1$^{th}$ and i$^{th}$ driving stages of a front even driving stage group to sequentially output the second and fourth carry signals, each of the holding stages includes the same elements as those of the first holding stage HS1 illustrated in FIGS. 9 and 10, and thus, descriptions of its configuration and operation are omitted.

Except for that the even shift clock line part 301b includes four shift clock lines which are supplied with even-numbered gate shift clocks GCLK2, GCLK4, GCLK6, and GCLK8 of the first to eighth gate shift clocks GCLK1 to GCLK8 having a sequentially shifted phase from the timing control circuit, the even shift clock line part 301b is the same as the illustrations of FIGS. 4 to 6, and thus, its overlapping description is omitted.

Except for that the even scan holding clock line part 302b includes two scan holding clock lines which are supplied with second and fourth scan holding clocks HCLK2 and HCLK4 of the first to fourth scan holding clocks HCLK1 to HCLK4 having a sequentially shifted phase from the timing control circuit, the even scan holding clock line part 302b is the same as the illustrations of FIGS. 4 to 7, and thus, its overlapping description is omitted.

The even power line part 303b include first to fourth power lines which are supplied with the first driving power Vdd1, the second driving power Vss1, the first node control power Vdd2, and the second node control power Vss2 from the power generation circuit. The even power line part 303b is the same as the illustrations of FIGS. 4 to 7, and thus, its overlapping description is omitted.

Except for that the even reset clock line part 304b includes two reset clock lines which are supplied with second and fourth stage reset clocks RST2 and RST4 of the first to fourth stage reset clocks RST1 to RST4 from the timing control circuit, the even reset clock line part 304b is the same as the illustrations of FIGS. 4 to 7, and thus, its overlapping description is omitted.

A display apparatus including the gate driving circuit 300 according to the present embodiment may provide the same effect as that of the above-described display apparatus according to an embodiment of the present disclosure and may secure a data charging period when high speed driving of 120 Hz or more is performed, based on left-right overlap driving of a scan pulse using the single feeding-based interlacing manner using the first shift register 300a and the second shift register 300b.

Each of the first and second shift registers 300a and 300b of the gate driving circuit 300 illustrated in FIGS. 12 and 13 may have the same configuration as that of the gate driving circuit illustrated in FIGS. 5 to 10. In this case, the first shift register 300a may supply the scan pulse to one side of each of the plurality of gate lines, and simultaneously, the second shift register 300b may supply the scan pulse to the other side of each of the plurality of gate lines. Therefore, each of the plurality of gate lines may be driven in a double feeding manner where the scan pulse is simultaneously supplied to both sides of each of the gate lines, and thus, the voltage drop of the scan pulse caused by a line resistance of each of the gate lines is minimized, thereby improving a data charging characteristic.

In addition, each of the first and second shift registers 300a and 300b of the gate driving circuit 300 illustrated in FIGS. 12 and 13 may be configured identical to the gate driving circuit illustrated in FIG. 11.

Figure 14A:
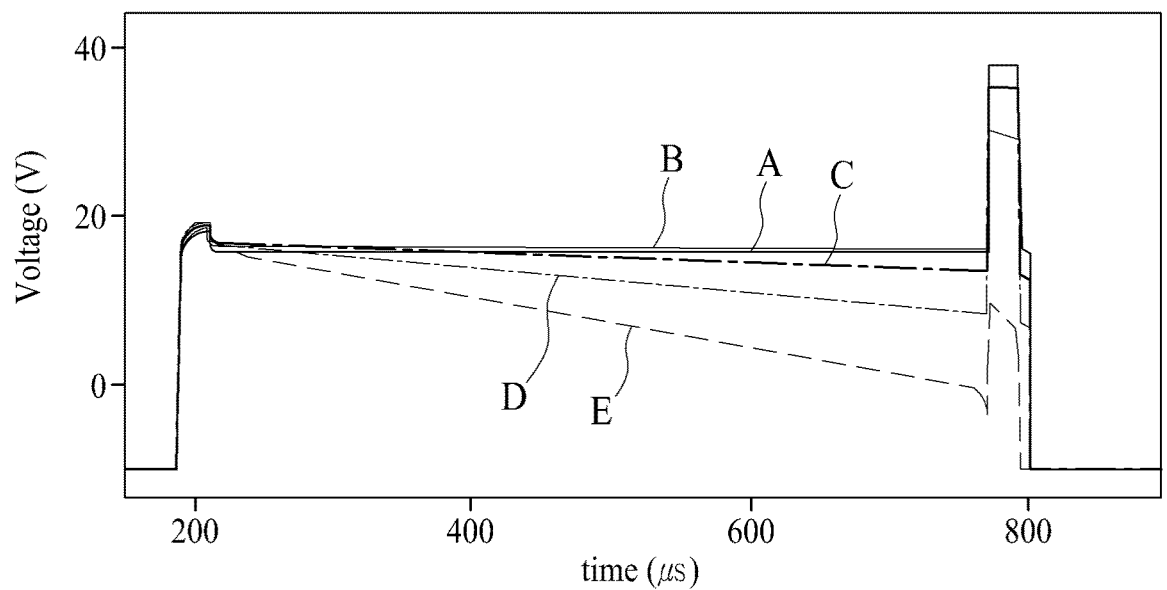
FIG. 14A illustrates waveform diagrams showing results obtained by measuring a voltage variation of a first control node during a touch sensing period in a holding stage according to an embodiment of the present disclosure.
Figure 14B:
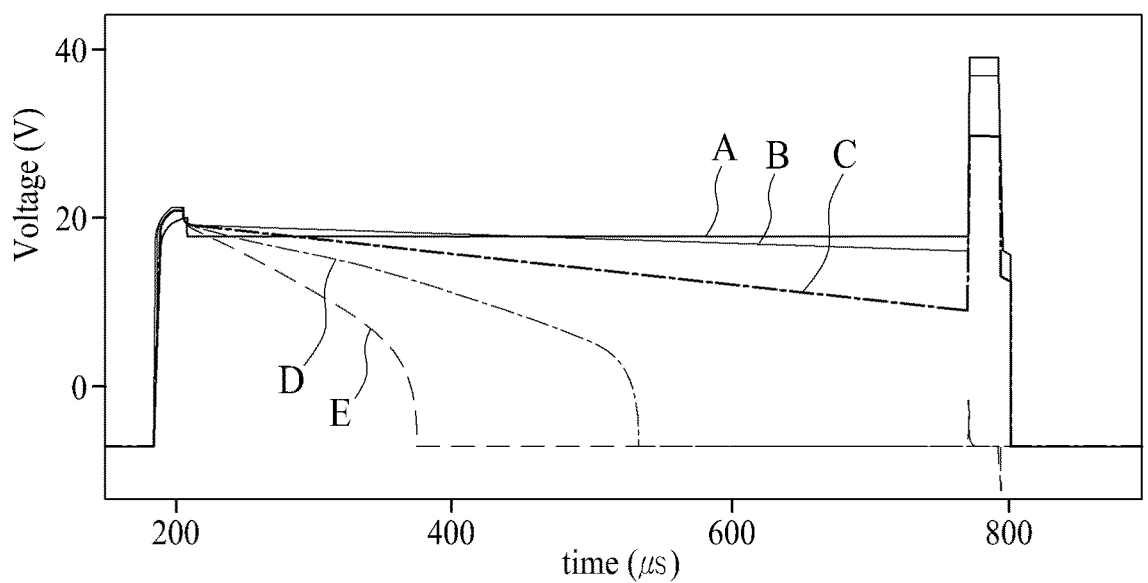
FIG. 14B illustrates waveform diagrams showing results obtained by measuring a voltage variation of a first control node during a touch sending period in a holding stage according to a comparative example.

FIGS. 14A and 14B are waveform diagrams showing results obtained by measuring a voltage variation of a first control node during a touch sensing period in each of a holding stage according to an embodiment of the present disclosure and a holding stage according to a comparative example.

In FIG. 14A, an A waveform, a B waveform, a C waveform, a D waveform, and an E waveform show voltage variations of a first control node N1 when a third transistor cT3 included in a holding stage has threshold voltages of 0V, −0.5V, −1V, −1.5V, and −2V and a second node control power Vss2 connected to a source terminal of the third transistor has an AC voltage. In FIG. 14B, an A waveform, a B waveform, a C waveform, a D waveform, and an E waveform show voltage variations of the first control node when the third transistor cT3 included in the holding stage has threshold voltages of 0V, −0.5V, −1V, −1.5V, and −2V and the second node control power Vss2 connected to the source terminal of the third transistor has a direct current (DC) voltage.

As seen in each of the A waveform, the B waveform, the C waveform, the D waveform, and the E waveform shown in FIG. 14A, even when the third transistor cT3 has threshold voltages of 0V, −0.5V, −1V, −1.5V, and −2V, it may be confirmed that a voltage of the first control node N1 according to an embodiment of the present disclosure is stably held during a period where the voltage of the first control node is held.

On the other hand, as seen in the D waveform and the E waveform shown in FIG. 14B, it may be confirmed that when the third transistor cT3 has a threshold voltage of −1.5V or −2V, the voltage of the first control node N1 according to the comparative example is not held during the period where the voltage of the first control node is held.

Figure 15A:
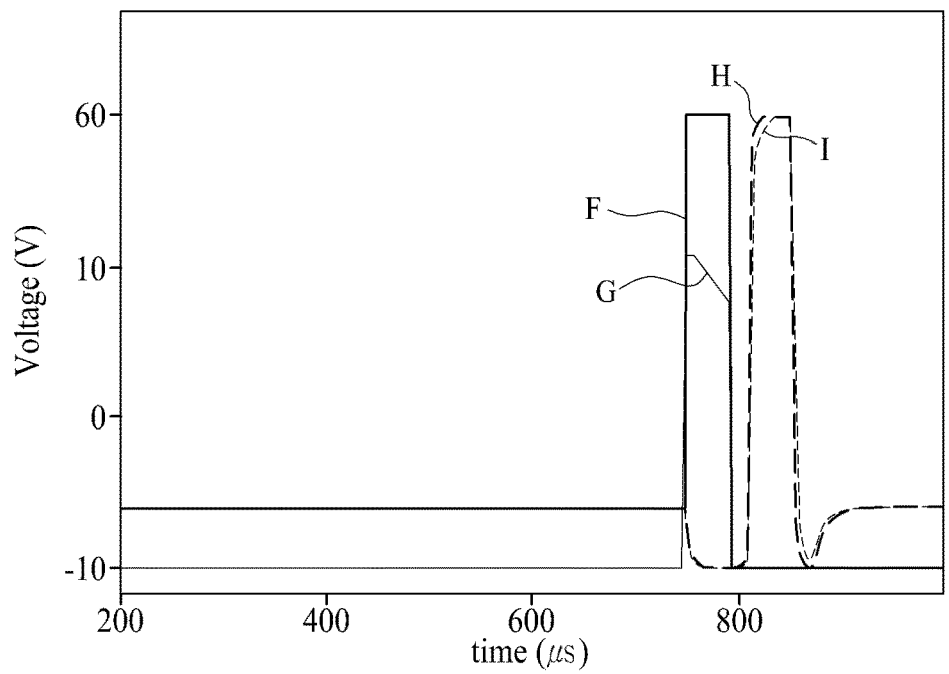
FIG. 15A illustrates waveform diagrams of a carry signal output from a holding stage according to an embodiment of the present disclosure.
Figure 15B:
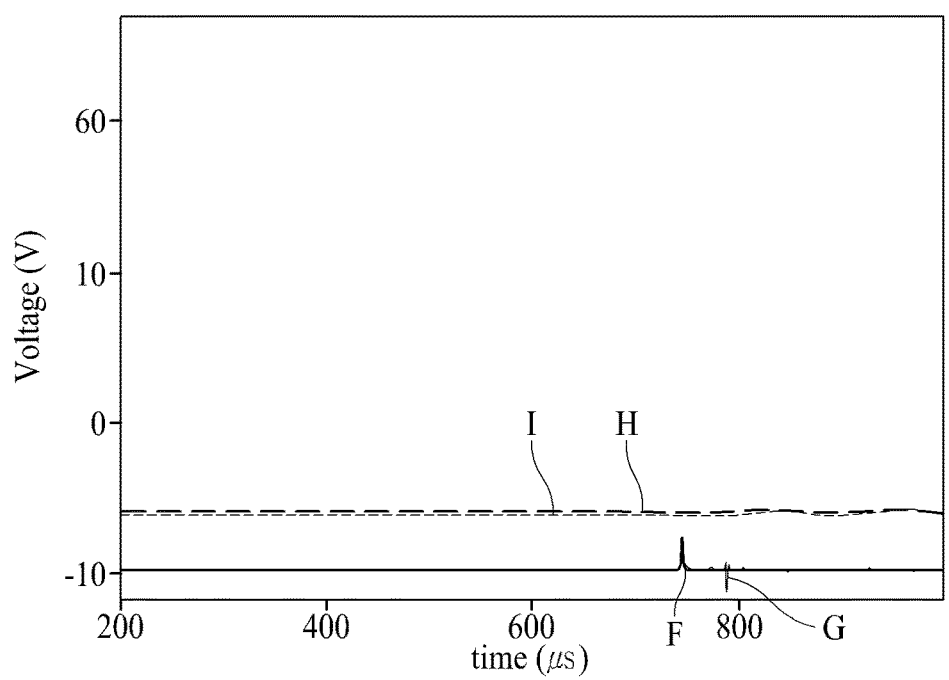
FIG. 15B illustrates waveform diagrams of a carry signal output from a holding stage according to a comparative example.

FIGS. 15A and 15B are waveform diagrams of a carry signal output from a holding stage according to an embodiment of the present disclosure and a carry signal output from a holding stage according to a comparative example.

In each of FIGS. 15A and 15B, an F waveform shows an output signal of a first output transistor cTu having a threshold voltage of −1.5V in a holding stage, a G waveform shows an output signal of the first output transistor cTu having a threshold voltage of −2.0V, an H waveform shows an output signal of a first pull-up transistor Tu having a threshold voltage of −1.5V in a first driving stage of a driving stage group, and an I waveform shows an output signal of the first pull-up transistor Tu having a threshold voltage of −2.0V.

As seen in the F waveform and the G waveform shown in FIG. 15A, it may be confirmed that even when the first output transistor has a threshold voltage of −1.5V or −2.0V, an output signal of the holding stage according to an embodiment of the present disclosure is normally output. Also, as seen in the H waveform and the I waveform, it may be confirmed that even when the first pull-up transistor has a threshold voltage of −1.5V or −2.0V, an output signal of the first driving stage according to an embodiment of the present disclosure is normally output.

On the other hand, as seen in the F waveform, the G waveform, the H waveform, and the I waveform shown in FIG. 15B, it may be confirmed that the output signal of each of the holding stage and the first driving stage according to the comparative example is abnormally output.

Therefore, in the present disclosure, a precharged voltage of a first control node of each of holding stages is stably held for a long time in the touch sensing period, based on an AC voltage of each of the first node control power and the second node control power, and thus, the carry signal and the scan pulse are normally output.

A display apparatus according to an embodiment of the present disclosure includes a display panel including a display area including a plurality of gate lines, a plurality of data lines, and a plurality of touch sensors, a gate driving circuit dividing the display area into a plurality of horizontal blocks and driving gate lines of a horizontal block by units of horizontal blocks at every display period in one frame, and a touch driving circuit sensing a touch through touch sensors of the horizontal block by units of horizontal blocks at every touch sensing period in the one frame, wherein the gate driving circuit may include a plurality of driving stage groups, each driving stage group including a plurality of driving stages supplying a scan pulse to gate lines included in a corresponding horizontal block at every display period, and a plurality of holding stage groups, each holding stage group between two driving stage groups, a holding stage group of the plurality of holding stage groups, between a rear driving stage group and a front driving stage group, including at least one holding stage supplying a carry signal to the rear driving stage group according to a voltage of a first control node and a voltage of a second control node based on first and second node control powers and an output signal supplied from the front driving stage group, and each of the first and second node control powers may include an alternating current (AC) voltage.

In the present disclosure, the first node control power may have a first voltage level in the display period, and the first node control power may have a second voltage level in the touch sensing period, is the second voltage level lower than the first voltage level.

In the present disclosure, the second node control power may have a third voltage level in the display period, and the second node control power may have a fourth voltage level in the touch sensing period, the fourth voltage level higher than the third voltage level.

In the present disclosure, the second node control power may rise from the third voltage level to the fourth voltage level after a predetermined period elapses from a falling time when the first node control power may fall from the first voltage level to the second voltage level.

In the present disclosure, the at least one holding stage may output a scan holding clock as the carry signal, based on the voltage of the first control node.

In the present disclosure, the scan holding clock may rise from a low voltage level VL to a high voltage level VH immediately after the touch sensing period ends or at a start time of the display period, and the scan holding clock may fall from the high voltage level VH to the low voltage level VL after a predetermined period elapses.

In the present disclosure, the first node control power may rise from the second voltage level to the first voltage level before a rising time of the scan holding clock, and the second node control power may fall from the fourth voltage level to the third voltage level before a rising time of the first node control power.

In the present disclosure, in the touch sensing period, the at least one holding stage may discharge the voltage of the second control node in response to a stage reset clock which is supplied after a falling time of the output signal supplied from the front driving stage group.

In the present disclosure, the second node control power may rise after a predetermined horizontal period elapses from a rising time of the stage reset clock.

In the present disclosure, the gate driving circuit may include a first shift register including a first subset of the plurality of driving stage groups and a first subset of the plurality of holding stage groups, the first shift register for supplying the scan pulse to odd-numbered gate lines of the plurality of gate lines; and a second shift register including a second subset of the plurality of driving stage groups and a second subset of the plurality of holding stage groups, the second shift register for supplying the scan pulse to even-numbered gate lines of the plurality of gate lines.

In the present disclosure, the display apparatus may further include a timing control circuit generating a time division driving signal for driving the one frame in the display period and the touch sensing period, and generating a power control signal, based on the time division driving signal and a power generation circuit generating each of the first node control power and the second node control power to supply each of the first node control power and the second node control power to the gate driving circuit, in response to the power control signal.

In the present disclosure, the at least one holding stage may include a carry output part outputting the carry signal in response to the voltage of the first control node and the voltage of the second control node, a first driver controlling the voltage of the first control node in response to the output signal supplied from the front driving stage group and the output signal supplied from the rear driving stage group, a second driver controlling the voltage of the first control node in response to the voltage of the second control node and the second node control power, a third driver controlling the voltage of the second control node in response to the output signal supplied from the front driving stage group, a fourth driver controlling the voltage of the second control node in response to the voltage of the first control node and the first node control power, and a fifth driver controlling the voltage of the second control node in response to a stage reset clock.

In the present disclosure, the first driver may include a first transistor including a gate terminal receiving the output signal supplied from the front driving stage group, a first terminal connected to a first driving power, and a second terminal connected to the first control node and a second transistor including a gate terminal receiving the output signal supplied from the rear driving stage group, a first terminal connected to a second driving power, and a second terminal connected to the first control node.

In the present disclosure, the second driver may include a third transistor including a gate terminal connected to the second control node, a first terminal connected to the second node control power, and a second terminal connected to the first control node.

In the present disclosure, the third driver may include a fourth transistor including a gate terminal receiving the output signal supplied from the front driving stage group, a first terminal connected to the second driving power, and a second terminal connected to the second control node.

In the present disclosure, the fourth driver may include a first driver transistor including a gate terminal connected to the first node control power and a second terminal connected to an intermediate node, a second driver transistor including a gate terminal connected to the intermediate node, a first terminal connected to the first node control power, and a second terminal connected to the second control node, a third driver transistor including a gate terminal connected to the first control node, a first terminal connected to the second driving power, and a second terminal connected to the intermediate node, and a fourth driver transistor including a gate terminal connected to the first control node, a first terminal connected to the second driving power, and a second terminal connected to the second control node.

In the present disclosure, the fifth driver may include a sixth transistor including a gate terminal receiving the stage reset clock, a first terminal connected to the second driving power, and a second terminal connected to the second control node.

In the present disclosure, the carry output part may include a first output transistor including a gate terminal connected to the first control node, a first terminal receiving a holding clock, and a second terminal connected to an output node, the first output transistor outputting the holding clock as the carry signal according to the voltage of the first control node, and a second output transistor including a gate terminal connected to the second control node, a first terminal connected to the second driving power, and a second terminal connected to the output node.

In the present disclosure, the touch driving circuit may supply a common voltage to touch electrodes included in a corresponding horizontal block at every display period and may sense a touch, performed by a touch object, through the touch electrodes included in the corresponding horizontal block at every touch sensing period.

In the present disclosure, the touch driving circuit may supply a common voltage to touch electrodes included in a corresponding horizontal block at every display period. Also, the touch driving circuit may supply a touch pen synchronization signal to the touch electrodes included in the corresponding horizontal block at every pen sensing period which is set in some of a plurality of touch sensing periods, and may sense a signal transferred from a touch pen through each of corresponding touch electrodes. Also, the touch driving circuit may supply a touch driving pulse to the touch electrodes included in the corresponding horizontal block at every finger sensing period which is set in other periods of the plurality of touch sensing periods, and may sense a capacitance variation of each of corresponding touch electrodes.

As described above, in the display apparatus according to the embodiments of the present disclosure, each of the first and second node control powers supplied to a plurality of holding stages which operate in each of a plurality of touch sensing periods in one frame may be supplied as an AC voltage (or an AC form), and thus, a voltage of a precharged node of each of the holding stages may be stably held for a long time in the touch sensing period, thereby minimizing deterioration of an output transistor which outputs a carry signal.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
a display panel including a display area including a plurality of gate lines, a plurality of data lines, and a plurality of touch sensors;
a gate driving circuit dividing the display area into a plurality of horizontal blocks and driving gate lines of a horizontal block by units of horizontal blocks at every display period in one frame; and
a touch driving circuit sensing a touch through touch sensors of the horizontal block by units of horizontal blocks at every touch sensing period in the one frame,
wherein the gate driving circuit comprises:
a plurality of driving stage groups, each driving stage group including a plurality of driving stages supplying a scan pulse to gate lines included in a corresponding horizontal block at every display period; and
a plurality of holding stage groups, each holding stage group between two driving stage groups, a holding stage group of the plurality of holding stage groups between a rear driving stage group and a front driving stage group, the holding stage group including at least one holding stage supplying a carry signal to the rear driving stage group according to a voltage of a first control node and a voltage of a second control node based on first and second node control powers and an output signal supplied from the front driving stage group, and
wherein each of the first and second node control powers comprises an alternating current (AC) voltage.

2. The display apparatus of claim 1, wherein the first node control power has a first voltage level in the display period, and the first node control power has a second voltage level in the touch sensing period, is the second voltage level lower than the first voltage level.

3. The display apparatus of claim 2, wherein the second node control power has a third voltage level in the display period, and the second node control power has a fourth voltage level in the touch sensing period, the fourth voltage level higher than the third voltage level.

4. The display apparatus of claim 3, wherein the second node control power rises from the third voltage level to the fourth voltage level after a predetermined period elapses from a falling time when the first node control power falls from the first voltage level to the second voltage level.

5. The display apparatus of claim 4, wherein the at least one holding stage outputs a scan holding clock as the carry signal, based on the voltage of the first control node.

6. The display apparatus of claim 5, wherein the scan holding clock rises from a low voltage level to a high voltage level immediately after the touch sensing period ends or at a start time of the display period, and the scan holding clock falls from the high voltage level to the low voltage level after a predetermined period elapses.

7. The display apparatus of claim 6, wherein
the first node control power rises from the second voltage level to the first voltage level before a rising time of the scan holding clock, and
the second node control power falls from the fourth voltage level to the third voltage level before a rising time of the first node control power.

8. The display apparatus of claim 4, wherein, in the touch sensing period, the at least one holding stage discharges the voltage of the second control node in response to a stage reset clock which is supplied after a falling time of the output signal supplied from the front driving stage group.

9. The display apparatus of claim 8, wherein the second node control power rises after a predetermined horizontal period elapses from a rising time of the stage reset clock.

10. The display apparatus of claim 1, wherein the gate driving circuit comprises:
a first shift register including a first subset of the plurality of driving stage groups and a first subset of the plurality of holding stage groups, the first shift register for supplying the scan pulse to odd-numbered gate lines of the plurality of gate lines; and
a second shift register including a second subset of the plurality of driving stage groups and a second subset of the plurality of holding stage groups, the second shift register for supplying the scan pulse to even-numbered gate lines of the plurality of gate lines.

11. The display apparatus of claim 1, further comprising:
a timing control circuit generating a time division driving signal for driving the one frame in the display period and the touch sensing period, and generating a power control signal, based on the time division driving signal; and a power generation circuit generating each of the first node control power and the second node control power to supply each of the first node control power and the second node control power to the gate driving circuit, in response to the power control signal.

12. The display apparatus of claim 11, wherein the at least one holding stage comprises:
a carry output part outputting the carry signal in response to the voltage of the first control node and the voltage of the second control node;
a first driver controlling the voltage of the first control node in response to the output signal supplied from the front driving stage group and the output signal supplied from the rear driving stage group;
a second driver controlling the voltage of the first control node in response to the voltage of the second control node and the second node control power;
a third driver controlling the voltage of the second control node in response to the output signal supplied from the front driving stage group;
a fourth driver controlling the voltage of the second control node in response to the voltage of the first control node and the first node control power; and
a fifth driver controlling the voltage of the second control node in response to a stage reset clock.

13. The display apparatus of claim 12, wherein the first driver comprises:
a first transistor including a gate terminal receiving the output signal supplied from the front driving stage group, a first terminal connected to a first driving power, and a second terminal connected to the first control node; and
a second transistor including a gate terminal receiving the output signal supplied from the rear driving stage group, a first terminal connected to a second driving power, and a second terminal connected to the first control node.

14. The display apparatus of claim 12, wherein the second driver comprises a third transistor including a gate terminal connected to the second control node, a first terminal connected to the second node control power, and a second terminal connected to the first control node.

15. The display apparatus of claim 12, wherein the third driver comprises a fourth transistor including a gate terminal receiving the output signal supplied from the front driving stage group, a first terminal connected to the second driving power, and a second terminal connected to the second control node.

16. The display apparatus of claim 12, wherein the fourth driver comprises:
a first driver transistor including a gate terminal connected to the first node control power and a second terminal connected to an intermediate node;
a second driver transistor including a gate terminal connected to the intermediate node, a first terminal connected to the first node control power, and a second terminal connected to the second control node;
a third driver transistor including a gate terminal connected to the first control node, a first terminal connected to the second driving power, and a second terminal connected to the intermediate node; and
a fourth driver transistor including a gate terminal connected to the first control node, a first terminal connected to the second driving power, and a second terminal connected to the second control node.

17. The display apparatus of claim 12, wherein the fifth driver comprises a sixth transistor including a gate terminal receiving the stage reset clock, a first terminal connected to the second driving power, and a second terminal connected to the second control node.

18. The display apparatus of claim 12, wherein the carry output part comprises:
a first output transistor including a gate terminal connected to the first control node, a first terminal receiving a holding clock, and a second terminal connected to an output node, the first output transistor outputting the holding clock as the carry signal according to the voltage of the first control node; and
a second output transistor including a gate terminal connected to the second control node, a first terminal connected to the second driving power, and a second terminal connected to the output node.

19. The display apparatus of claim 1, wherein the touch driving circuit supplies a common voltage to touch electrodes included in a corresponding horizontal block at every display period and senses a touch, performed by a touch object, through the touch electrodes included in the corresponding horizontal block at every touch sensing period.

20. The display apparatus of claim 1, wherein
the touch driving circuit supplies a common voltage to touch electrodes included in a corresponding horizontal block at every display period,
the touch driving circuit supplies a touch pen synchronization signal to the touch electrodes included in the corresponding horizontal block at every pen sensing period which is set in some of a plurality of touch sensing periods, and senses a signal transferred from a touch pen through each of corresponding touch electrodes, and
the touch driving circuit supplies a touch driving pulse to the touch electrodes included in the corresponding horizontal block at every finger sensing period which is set in other periods of the plurality of touch sensing periods, and senses a capacitance variation of each of corresponding touch electrodes.

21. A display apparatus comprising:
a display panel including a display area divided into multiple horizontal blocks, each horizontal block including a plurality of gate lines, and a plurality of touch sensors;
a touch driving circuit for sensing a touch through touch sensors in a horizontal block during a touch sensing period,
a gate driving circuit for driving gate lines of horizontal blocks during a display period, the gate driving circuit comprising:
a plurality of driving stage groups, each driving stage group including a plurality of driving stages supplying a scan pulse to gate lines of a corresponding horizontal block during the display period, the driving stage groups receiving a first power supply and a second power supply,
a plurality of holding stage groups, each holding stage group in between two driving stage groups, each holding stage group receiving:
a third power supply having a first voltage level during the display period and a second voltage level during at least a portion of the touch sensing period, and a fourth power supply having a third voltage level during the display period and a fourth voltage level during at least a portion of the touch sensing period, the third voltage different than the fourth voltage level.

22. The display apparatus of claim 21, wherein each holding stage group further receives the first power supply and the second power supply.

23. The display apparatus of claim 21, wherein the fourth power supply rises from the third voltage level to the fourth voltage level after a predetermined amount of time from when the third power supply falls from the first voltage level to the second voltage level.

* * * * *